United States Patent [19]

Williamson, Jr. et al.

[11] Patent Number: 5,336,097
[45] Date of Patent: Aug. 9, 1994

[54] MODULAR POWER DISTRIBUTION SYSTEM

[75] Inventors: Lawrence J. Williamson, Jr., Hudson, Ind.; Donald C. Smith, Hendersonville; Charles R. Snyder, Cottontown, both of Tenn.

[73] Assignee: RHC/Spacemaster Corporation, Melrose Park, Ill.

[21] Appl. No.: 146,426

[22] Filed: Oct. 29, 1993

Related U.S. Application Data

[63] Continuation of Ser. No. 894,065, Jun. 5, 1992, abandoned.

[51] Int. Cl.$^5$ ............................................. H01R 25/14
[52] U.S. Cl. ...................................... 439/94; 439/110; 439/121; 439/215
[58] Field of Search ............................. 439/110–122, 439/207–212, 215, 94, 100, 351, 352, 358

[56] References Cited

U.S. PATENT DOCUMENTS

| | | | |
|---|---|---|---|
| Re. 31,733 | 11/1984 | Haworth et al. | 52/70 |
| 1,189,435 | 7/1916 | Edmonds | 439/457 |

(List continued on next page.)

FOREIGN PATENT DOCUMENTS

| | | | |
|---|---|---|---|
| 0174733 | 3/1986 | European Pat. Off. . | |
| 0413242 | 2/1991 | European Pat. Off. . | |
| 1554310 | 1/1969 | France . | |
| 2346874 | 10/1977 | France | 439/210 |
| 35498 | 11/1970 | Japan | 439/114 |
| 47852 | 1/1965 | Luxembourg . | |
| 2203299 | 10/1988 | United Kingdom | 439/113 |

OTHER PUBLICATIONS

Industrial Electrical Products Catalog FRX.
Industrial Electrical Products Catalog FR-60.
Industrial Electrical Products Catalog FR-100.
Wiremold Company publication No. 37197 1089.
"Wiremold Cable System Adapters Installation Introductions" publication designated No. 37337 189.
"Braid Electric" publication.
Bryne Electrical Specialists, Inc. brochure for the "Eight Trac Power Center".
Panduit Corp. "Panduit Pan–Trunk" publication
Electric Busway Corp. Technical Catalog BW89.
AMP Incorporated AMP Catalog 89-867.
AMP Application Specification 114-6039.
AMP Instruction Sheet IS 9024.
"Electri-Pak 7'" publication.
Lightolier publication.
"Trac-Pac 8 Trac-Pac Product Overview" Publication.
"Sales Kit Trac Pac 8" sheet.
Pent incorporated brochure for the "UHI System".
Pent Incorporated brochure for the "Front Access System".
Pent Incorporated brochure for the "PAWS 8 Wire System".
Rosejohnson "Electrical Installation Manual" for the RJ Power system.
"Anderson Powerflex ™ III" brochure.
Drawing A.

*Primary Examiner*—Gary F. Paumen
*Attorney, Agent, or Firm*—Dressler, Goldsmith, Shore & Milnamow, Ltd.

[57] ABSTRACT

An electrical power distribution system is provided with an elongate track and a plurality of power tap assemblies that are engageable with the track. The power tap assemblies may be moved to any desired location along the track. Power may be fed into the track through one of the assemblies and taken out of the track through another of the assemblies. Receptacles may be mounted to one or more of the power tap assemblies. A latch system can hold the power tap assemblies in (1) a fully inserted, electrically engaging orientation and (2) an electrically disconnected orientation wherein the components are still supported on the track. The components employ spring terminals which establish electrical contact through a surface-to-surface butt engagement with a conducting member. Mechanical key systems are provided for preventing improper mounting of the components on the track and for preventing the connection of more than one power in-feed to the track.

16 Claims, 8 Drawing Sheets

U.S. PATENT DOCUMENTS

| | | | |
|---|---|---|---|
| 1,983,157 | 12/1934 | Wermine | 439/639 |
| 2,039,982 | 5/1936 | Schaller | 439/209 |
| 2,162,864 | 6/1939 | Rugg et al. | 174/70 |
| 2,250,513 | 7/1941 | Von Gehr | 439/120 |
| 2,292,394 | 8/1942 | O'Brien | 439/209 |
| 2,305,100 | 12/1942 | O'Brien | 439/31 |
| 2,320,332 | 5/1943 | Morten | 174/74 |
| 2,351,632 | 6/1944 | O'Brien | 439/639 |
| 2,407,894 | 9/1946 | Miller | 439/148 |
| 2,608,634 | 8/1952 | Abbott | 174/845 |
| 2,611,800 | 9/1952 | Naughton | 439/216 |
| 2,666,907 | 1/1954 | Hensley, Jr. | 439/111 |
| 2,748,359 | 5/1956 | Swan | 439/502 |
| 2,952,829 | 9/1960 | Grohsgal | 439/214 |
| 2,979,686 | 4/1961 | Longmire | 439/115 |
| 3,529,389 | 9/1970 | Wilkins | 52/221 |
| 3,605,064 | 9/1971 | Routh et al. | 200/51 R |
| 3,683,101 | 8/1972 | Liberman | 174/49 |
| 3,715,627 | 2/1973 | D'Ausilio | 174/48 |
| 3,801,951 | 4/1974 | Kemmerer et al. | 439/120 |
| 3,856,981 | 12/1974 | Boundy | 174/48 |
| 3,894,781 | 7/1975 | Donato | 439/121 |
| 3,984,621 | 10/1976 | Propst | 174/48 |
| 4,001,571 | 1/1977 | Martin | 174/49 |
| 4,029,378 | 6/1977 | Bolis | 439/116 |
| 4,043,626 | 8/1977 | Propst et al. | 52/220 |
| 4,056,297 | 11/1977 | Cartung | 174/48 |
| 4,108,523 | 8/1978 | Bolis | 439/116 |
| 4,135,775 | 1/1979 | Driscoll | 52/221 |
| 4,245,726 | 1/1981 | Kohler | 439/121 |
| 4,370,008 | 1/1983 | Haworth et al. | 439/165 |
| 4,377,724 | 3/1983 | Wilson | 174/48 |
| 4,688,869 | 8/1987 | Kelly | 439/209 |
| 4,720,274 | 1/1988 | Tackett | 439/668 |
| 4,778,397 | 10/1988 | Contant et al. | 439/116 |
| 4,881,907 | 11/1989 | Bergman et al. | 439/110 |

Fig. 1
Fig. 2
Fig. 3
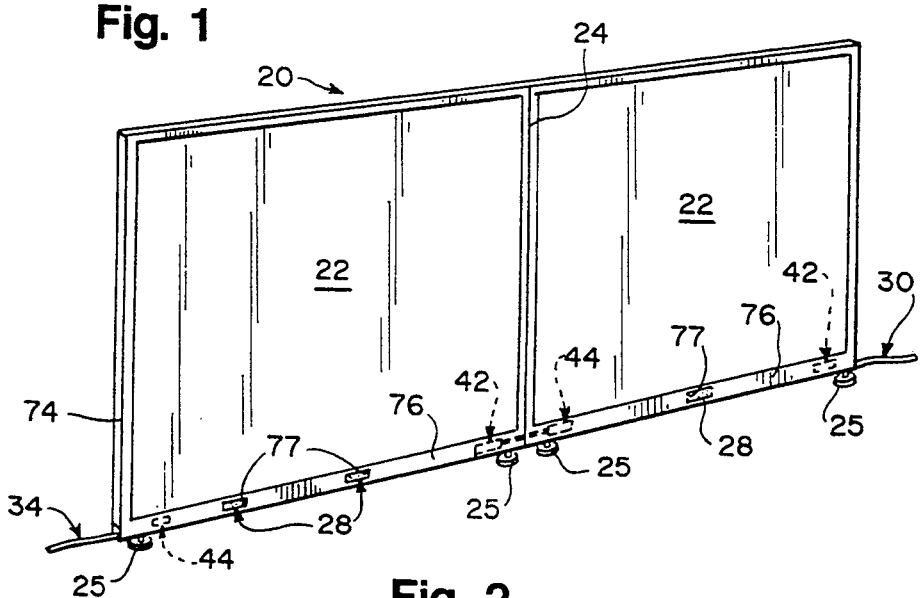
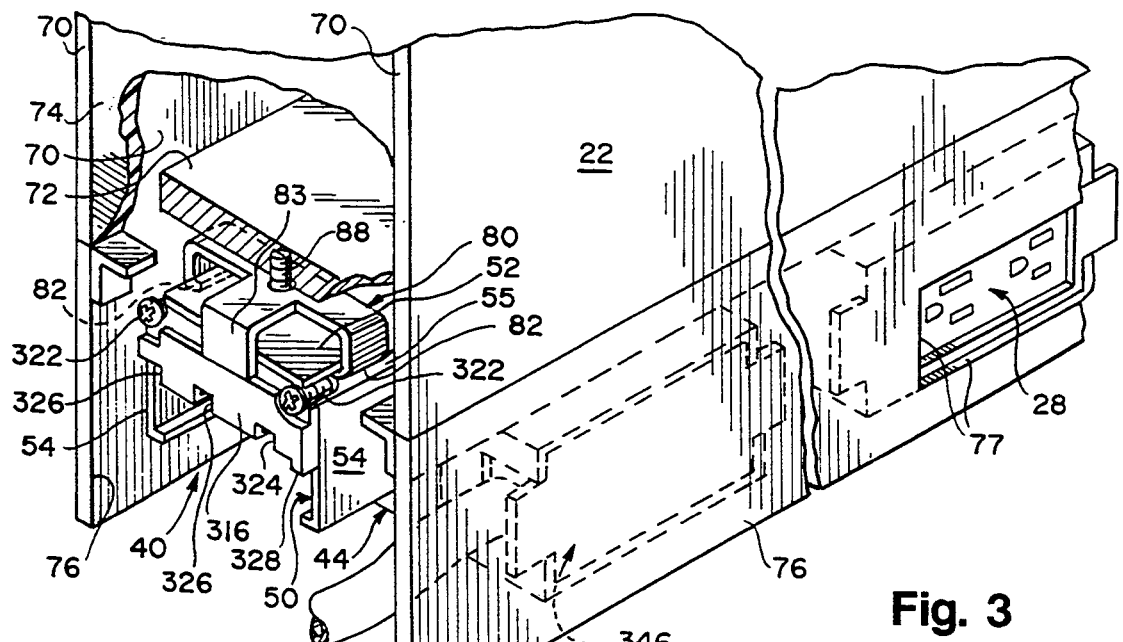
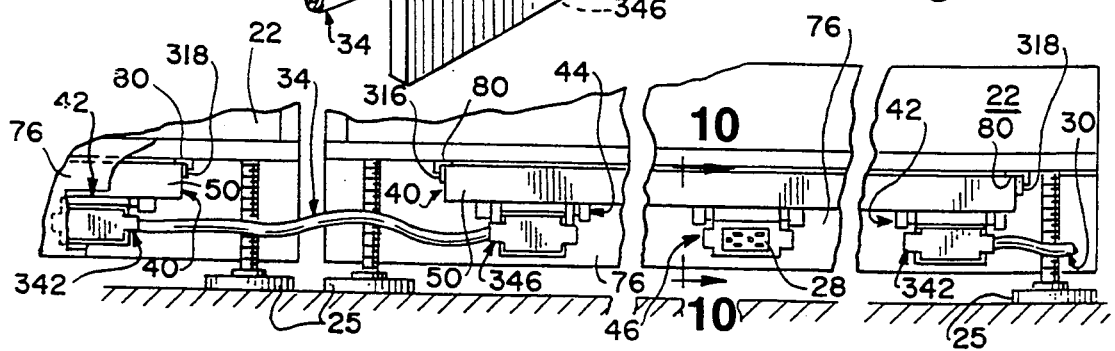

| CIRCUIT DISPOSITION | POSITIONS | | | | | | | | | |
|---|---|---|---|---|---|---|---|---|---|---|
| | 1 | 2 | 3 | 4 | 5 | 6 | 7 | 8 | 9 | 10 |
| 10 - WIRE, 4 CIRCUITS | L1 | N1 | L2 | G1,2 | N2 | L3 | N3 | G3,4 | L4 | N4 |
| 8 - WIRE, 3 CIRCUITS | L1 | N1 | L2 | G1,2 | N2 | | | G3,4 | L4 | N4 |
| 6 - WIRE, 2 CIRCUITS | L1 | N1 | L2 | G1,2 | | | | | L4 | N4 |
| 5 - WIRE, 2 CIRCUITS | L1 | N1 | L2 | G1,2 | N2 | | | | | |
| 3 - WIRE, 1 CIRCUITS | L1 | N1 | | G1,2 | | | | | | |

Fig. 7
Fig. 8
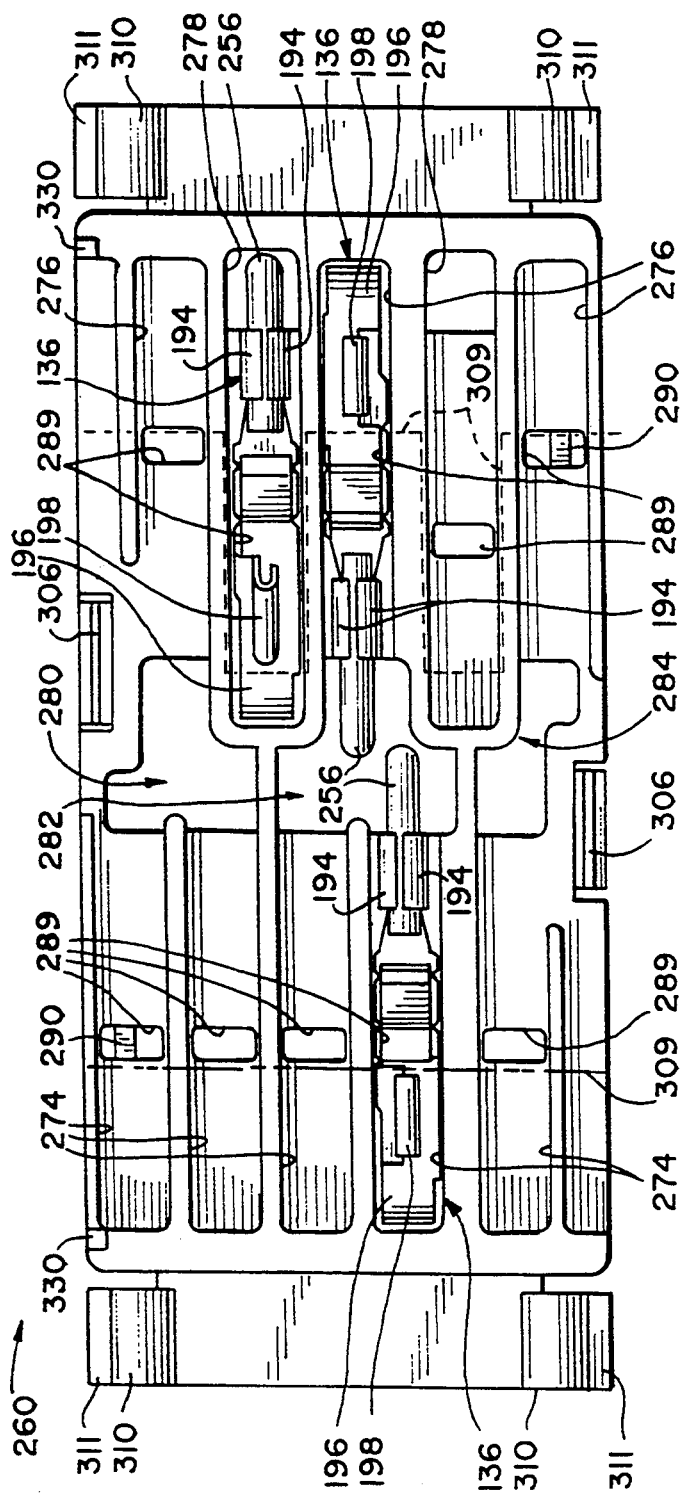
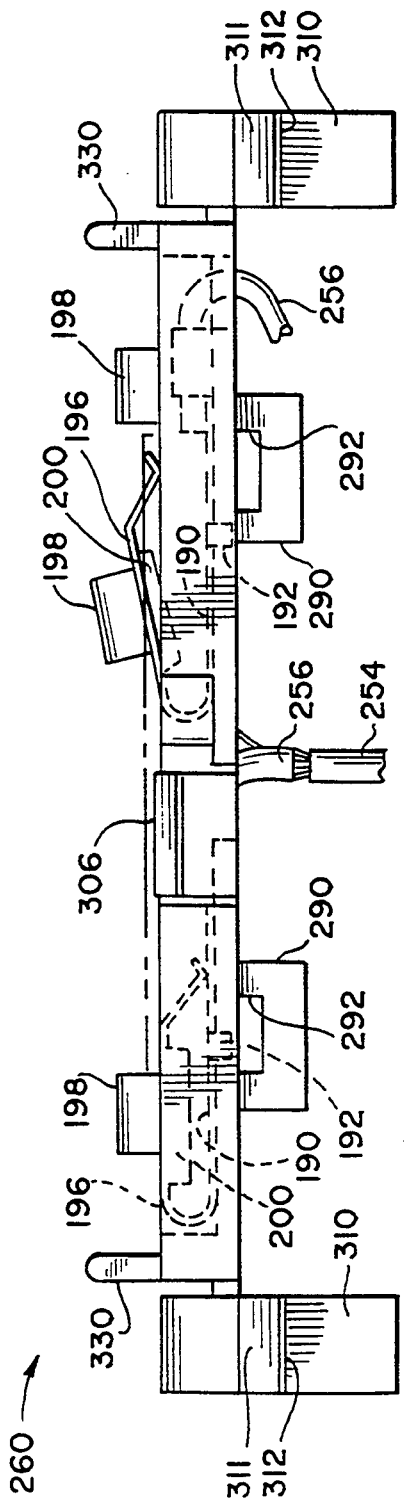

MODULAR POWER DISTRIBUTION SYSTEM

This application is a continuation of application Ser. No. 07/894,065, filed Jun. 5, 1992, now abandoned.

TECHNICAL FIELD

The present invention relates to an electrical power distribution or conducting system and components therefor, Although the system is suitable for use in distributing electrical power at selected locations along a structure, the system is particularly suitable for use in association with prefabricated, office furniture partitions, dividers, panels, and the like which are typically used to form office cubicles or otherwise divide an open space into a plurality of separate work spaces.

BACKGROUND OF THE INVENTION AND TECHNICAL PROBLEMS POSED BY THE PRIOR ART

There is a growing need for improved components and systems for accommodating the distribution of electrical power along structures or in structures, including prefabricated office furniture, mobile homes, prefabricated homes, vehicles, aircraft, marine vessels, and the like. Examples of electrical systems provided in office furniture panels are disclosed in U.S. Pat. Nos. 4,135,775, 4,688,869, 4,370,008, and 4,056,297. While these examples illustrate various features, additional or improved features are provided by the present invention.

An electrical power distribution system should desirably have the design flexibility and capability for being readily adaptable for use with, or for installation in, a variety of structures so as to be able to supply electrical power to a variety of electrical apparatus, components, or secondary distribution systems. Preferably, such a system should be substantially prewired and include components, such as holders for receptacles, which are movable and infinitely adjustable to selected positions along the system length.

It would be beneficial if such a system could be provided with an improved design facilitating fabrication in a modular format that accommodates the use of a number of identical components, or substantially similar components, which have a uniform length and width.

Such an improved system design should advantageously facilitate manufacturing, rapid and low cost installation, rapid re-arrangement of components in the field, relocation and interchangeability of components, retrofitting of the system, etc.

It would be desirable if such an improved system could be incorporated in a design that permits its manufacture, installation, and use with a minimum of quality control, inspection, and testing operations, and which requires few or no special tools.

Advantageously, an improved system should preferably employ a versatile design that is relatively narrow and which can accommodate mounting mechanisms for facilitating use of the system in a variety of different conventional structures, including in a variety of different office furniture panel products.

Preferably, the improved design should permit the system manufacturer to furnish the system to the customer or user in the form of partially assembled, or partially connected, sub-assemblies of various movable and releasable components. Thus, with respect to many of the components, the user or installer would need only to move some of the pre-assembled or pre-mounted components relative to other components, to desired locations as dictated by the particular field requirements.

It would also be desirable to provide the electrical distribution system with an improved terminal design in the components so that the components can be assembled with relatively low insertion forces in order to minimize the probability that an installer may improperly attempt to force components together.

Such an improved design should also provide sufficient electrical contact forces and a reliable electrical contact connection, as well as improved safety of operation. Advantageously, such an improved terminal design should also facilitate component disengagement by accommodating, or contributing to, the necessary removal or disengagement forces.

An improved system design should also permit the components to be fabricated in relatively small sizes, especially with respect to width and height dimensions, so as to minimize the required installation space. This would provide increased room or space for other components in a structure, such as in an office furniture panel. For example, such an improved electrical distribution system may be mounted along the bottom of an office furniture panel, and it may be desirable to ensure that there is sufficient space adjacent the electrical distribution system for accommodating communication wiring and other services.

It would also be advantageous if an electrical distribution system could accommodate removal or relocation of some components (e.g., receptacles) without disruption of power to the rest of the system. Further, the system should accommodate power supplied from a selected one of a variety of locations exterior of the system, and should accommodate branching of the system (e.g. branching to a plurality of connected office furniture panels).

The improved distribution system design should advantageously accommodate various voltage and current ranges. Further, the design should preferably have the capability for being supplied in one basic conductor configuration which can accommodate multiple circuit configuration alternatives. It would also be desirable for such a system to have the capability for accommodating many conductors without requiring excessively wide components so as to facilitate installation in relatively narrow structures (e.g., office furniture panels).

Another salutary feature of such an improved design would be the capability for mounting power input and output connectors (e.g., power tap assemblies) on either side of a structure (e.g., an office furniture panel) and for accommodating a back-to-back mounting of other components, such as receptacles.

It would also be desirable to provide an improved electrical power distribution system with a unique configuration to prevent more than one power feed connection to a group of conducting elements and to prevent removal of a power feed tap assembly. Such an improved system should preferably have a directional configuration so that power feeds or entry connections can never be inadvertently interconnected.

Additionally, it would be advantageous if such a system included movable power tap assemblies for the power feed and power outlet connectors, as well as receptacles, so as to permit the use of a standard, single-length, flexible, connector jumper cable assembly between modules to accommodate variation in module spacing and to permit slack to be taken up between closely spaced modules. This would be particularly advantageous for use with office furniture panel systems having differing inter-panel spacing dimensions.

It would also be desirable to provide an improved electrical power distribution system with a mechanical interlock system, keying system, or mechanical polarization system for ensuring that components are properly installed and engaged, as well as to prevent improper orientation of components and to prevent removal of certain components.

It would be beneficial if such an improved system could be provided in designs specifically suitable for a variety of environments, including office furniture panel products. Such an electrical power distribution system should preferably include a rigid frame and have the capability for being provided with an integral ground circuit which can be electrically contacted directly by the movable, attachable components such as power tap assemblies, receptacle holders, etc.

Further, such an improved system design should preferably have the capability for employing elongated connecting elements to accommodate movable, engageable power tap assemblies that do not rely on friction clamping for maintaining electrical contact and that require only a minimum amount of force for engagement, disengagement, and relocation.

It would be desirable to provide components for use with such an improved system which could be adapted to securely, safely, and releasably hold or otherwise engage conventional electrical devices, including conventional outlet receptacles.

Further, it would be advantageous to provide an improved design with the capability for accommodating, where desired, a directional power design involving multiple circuits with one, and preferably two, grounds.

The present invention provides improved electrical power distribution system components which can accommodate designs having the above-discussed benefits and features.

SUMMARY OF THE INVENTION

The present invention provides unique components for use in, or as part of, a novel electrical power distribution system. The system can be used for distributing electrical power at selected locations along a structure. The system, or components thereof, may be employed to supply power to various electrical devices.

The system is particularly suitable for use in free standing, prefabricated, office furniture partitions, dividers, panels, or the like. In a typical office furniture panel application contemplated by the present invention, power is provided to electrical outlet receptacles into which can be plugged the power cords of typical office equipment, such as typewriters, computers, etc.

A preferred form of the system of the present invention is extremely versatile and is adaptable to a variety of applications and configurations. The system offers improved safety by providing a directional feature that prevents the possibility of installing two power feeds.

In the preferred form of the system, the force that is required to insert components is relatively low so as to minimize the possibility of incorrectly installing components.

Further, the presently preferred form of the invention can be manufactured to high-quality standards with a reduced amount of required quality inspection and testing.

In a preferred form of the invention, male and female power tap assemblies are movable to allow a single length, flexible, connector or jumper cable assembly to be employed. Other power tap assemblies, such as outlet receptacle holders, are movable to accommodate desired orientation configurations, positioning, and locations. The system of the present invention, in the preferred form, accommodates the use of conventional receptacles.

The components of the present invention are suitable for being mounted to a variety of structures, including a variety of conventional office furniture panels. The components can be compactly mounted in the interior raceway portion of such panels so that other systems, such as data systems and communication systems, may be effectively and efficiently routed through the same panel raceway.

Further, in a presently most preferred form of the invention, the system is designed to accommodate up to a ten-wire configuration which can include up to four circuits, including two ground conductors.

One general aspect of the invention includes an elongate, insulating carrier suitable for being mounted to a structure along which electrical power distribution is desired. The carrier has a plurality of spaced-apart walls defining a recess between each pair of adjacent walls and has a reduced width opening thereto. A plurality of elongate conducting elements are each disposed within one of the insulating carrier recesses to present an elongate electrical contact surface facing outwardly toward the recess opening. A power tap means is provided for being selectively positioned and retained along the insulating carrier to conduct electricity into or out of the elongate conducting elements. The power tap means includes a plurality of terminals each defining an engagement surface for being releasably maintained in face-to-face engagement with one of the outwardly facing contact surfaces of one of the conducting elements.

According to another aspect of the invention, there is provided an elongate electrical conducting system with which a multi-terminal power tap assembly can be engaged to conduct electricity into or out of the system. The system includes an elongate, electrically conductive support frame suitable for being mounted to a structure along which electrical power distribution is desired. The frame defines an elongate receiving channel therein and has an elongate electrical contact ground surface located within the channel to face outwardly of the channel for being engaged by a terminal of the power tap assembly. At least one insulating carrier is mounted in the channel to permit access to the ground surface from outside of the channel. The carrier has a plurality of spaced-apart walls defining a recess between each pair of adjacent walls. A plurality of elongate conducting elements are each disposed within one of the insulating carrier recesses to define a contact surface facing outwardly of the channel for being engaged by a terminal of the power tap assembly.

According to another aspect of the invention, a selectively positionable power tap assembly is provided for an electrical power distribution system that includes (1) an elongate insulating carrier suitable for being mounted to a structure along which electrical power distribution is desired, and (2) a plurality of elongate, parallel, conducting elements disposed in an equally spaced-apart array within, and across a portion of the width of, the insulating carrier to each present an elongate electrical contact surface. The power tap assembly can be characterized as including a power tap terminal holder for being selectively positioned and retained along the elongate conducting elements in the insulating carrier so as to conduct electricity into or out of the elongate conducting elements. The power tap assembly also includes a plurality of substantially identical terminals mounted in the terminal holder. Each terminal defines an engagement surface for being releasably maintained in face-to-face engagement with a respective one of the conducting element electrical contact surfaces. At least two of the terminals are adapted to each engage a respective one of the two adjacent conducting elements and are arranged in the terminal holder to be (1) longitudinally offset relative to the lengths of the conducting elements by an amount exceeding the terminal maximum length and (2) laterally offset by an amount that is generally equal to the centerline spacing between the two adjacent conducting elements but that is less than the terminal maximum width whereby the width of the power tap terminal holder can be minimized.

Another aspect of the invention broadly relates to a specific form of a power tap assembly in an electrical power distribution system that includes a plurality of spaced-apart, parallel, elongate, conducting elements. The power tap assembly includes a terminal holder or carrier and a plurality of a first set of terminals mounted in an array on the top of the carrier. The power tap assembly also includes an adaptor housing extending from the bottom of the terminal carrier. The adaptor housing has (1) a guide wall defining a plurality of spaced-apart vertical passages and (2) a receiving cavity adjacent the guide wall for releasably receiving an electrical connector having a plurality of a second set of terminals. The guide wall also defines apertures through the guide wall to establish communication between the passages and the cavity. Conducting members are each connected to one of the first terminals and extend into a respective one of the vertical passages across a respective one of the apertures. Thus, the first terminals can be engaged with the elongate conducting elements, and the second terminals can be engaged through said apertures with the conducting members.

A further aspect of the invention relates to a latching system for use with the system for distributing electrical power at selected locations along a structure. A conductor assembly is provided with elongate, electrically conducting elements suitable for being disposed along the structure. The conductor assembly further includes a pair of spaced-apart, elongate walls that are electrically insulated from the conducting elements and that are disposed to project outwardly along the conducting elements to define a channel opening to the conducting elements. Each wall preferably includes a lip projecting toward the other wall. A power tap assembly is provided for being disposed at least partly within the channel at selected locations along the conductor assembly. The power tap assembly has a plurality of terminals for each engaging one of the conducting elements. The power tap assembly and the conductor assembly cooperatively define an insertion depth-positioning structure for releasably retaining the power tap assembly in (1) a fully inserted position with the terminals engaged with the conducting elements and (2) a partially inserted position with said terminals disengaged from the conducting elements to accommodate relocation of the power tap assembly along the length conductor assembly.

Preferably, the depth-positioning structure includes at least one pair of spaced-apart tabs on the power tap assembly. Each tap is deflectable inwardly toward the other from an unstressed configuration. Each tab includes an outwardly facing camming surface terminating in a latch surface. The camming surfaces can be engaged by the wall lips and are deflected inwardly as the power tap assembly is inserted into the channel until the camming surfaces have moved past the lips and the tabs are free to return to the unstressed configuration where the latch surfaces releasably engage the lips to retain the power tap assembly on the walls in a fully inserted position with the terminals engaged with the conducting elements.

The insertion depth-positioning structure also includes, in the preferred embodiment, a bottom surface of the power tap assembly which supports the power tap assembly on the conductor assembly channel wall lips while the terminals are disengaged from the conducting elements when the power tap assembly is withdrawn from the fully inserted position to the partially inserted position.

A unique terminal design is another aspect of the invention. The terminal can be used with an elongate electrical conducting system having an elongate conducting element that is recessed between two walls of an insulating carrier and that can be engaged with an electrical conducting element to conduct electricity into or out of the system. The terminal includes a base for mounting to a support. A wire holding means is provided on the base for holding a wire. A cantilevered spring arm extends from, and is bent over, the base, and a tab projects outwardly from the arm for engaging the conducting element between the carrier walls.

Finally, the present invention also provides a unique assembly of a support frame, insulating carrier, and bus bars. The assembly includes an elongate support frame suitable for being mounted to a structure along which electrical power distribution is desired. The support frame defines a first, elongate, main channel and a second elongate channel parallel to, and in communication with, the first channel. The frame has a pair of flanges defining an intermediate opening which is located between the first and second channels and which is narrower than the second channel. An insulating carrier is received in the frame. The carrier has a bus bar holder portion in the frame first channel. A neck portion of the frame extends through the intermediate opening. The frame has a retention head that is wider than the intermediate opening and that is disposed in the frame second channel to mount the carrier in the frame. The carrier bus bar holder portion has a plurality of spaced-apart walls defining (1) a recess between each pair of adjacent walls and (2) a reduced width opening thereto. A bus bar is disposed within each of the insulating carrier recesses to present an elongate electrical contact surface facing outwardly toward the recess opening for engagement by an electrical terminal. Numerous other advantages and features of the present invention will become readily apparent from the following detailed description of the invention, from the claims, and from the accompanying drawings.

BRIEF DESCRIPTION OF THE DRAWINGS

In the accompanying drawings that form part of the specification, and in which like numerals are employed to designate like parts throughout the same, FIG. 1 is a fragmentary, perspective view of an office furniture panel system incorporating one form of the electrical power distribution system of the present invention;

FIG. 2 is a greatly enlarged, fragmentary, perspective view of the lower, left-hand corner of the panel system illustrated in FIG. 1 with portions cut away to show interior details;

FIG. 3 is a fragmentary, enlarged view of the lower portion of the panel system illustrated in FIG. 1 with the near side skirt members removed to show interior details;

FIG. 7 is an enlarged, plan view of a terminal carrier base with three terminals shown therein and the others omitted for ease of illustration;

FIG. 8 is a side elevation view of the terminal carrier base shown in FIG. 7;

DESCRIPTION OF THE PREFERRED EMBODIMENTS

Figures 4A, 4B:
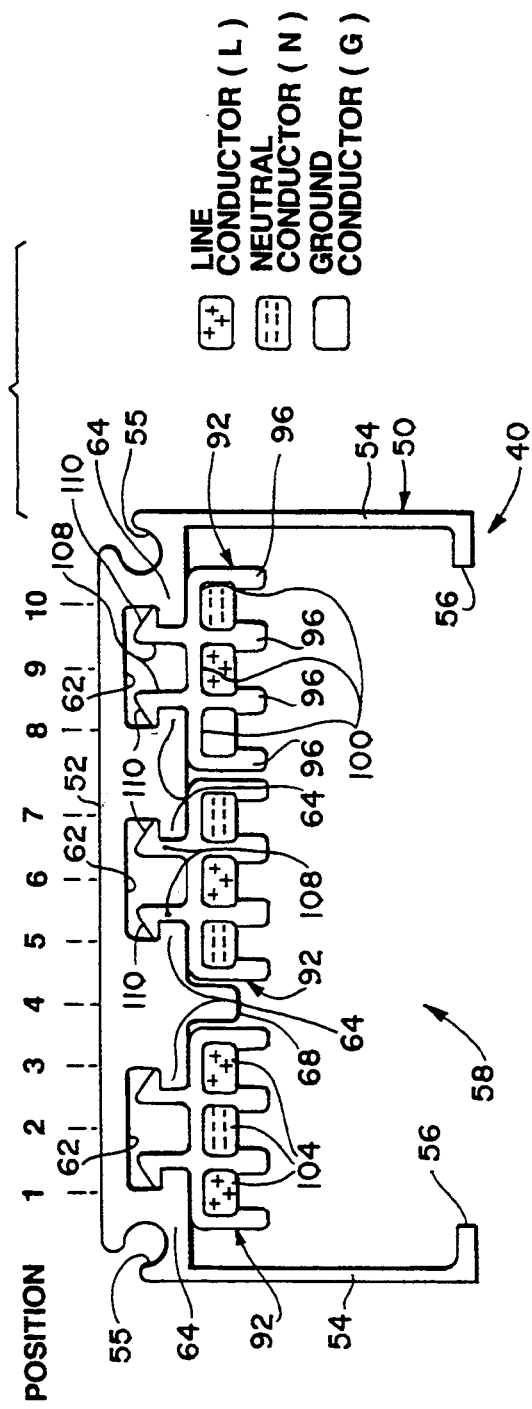
FIG. 4A is an end view of the conductor assembly of the present invention shown partially diagrammatically to illustrate the conductor circuit arrangement.
FIG. 4B is a tabulation of the conductor circuit arrangement with reference to the conductors as identified in FIG. 4A.

While this invention is susceptible of embodiment in many different forms, this specification and the accompanying drawings disclose only some specific preferred forms as examples of the invention. The invention is not intended to be limited to the embodiments so described, however. The scope of the invention is pointed out in the appended claims.

For ease of description, the components of this invention are described in the normal (upright) operating position, and terms such as upper, lower, horizontal, etc., are used with reference to this position. It will be understood, however, that the components of this invention may be manufactured, stored, transported, used, and sold in an orientation other than the position described.

Some of the figures illustrating embodiments of the components show structural details and mechanical elements that will be recognized by one skilled in the art. However, the detailed descriptions of such elements are not necessary to an understanding of the invention, and accordingly, are not herein presented.

Some of the components of this invention are used with certain conventional devices the details of which, although not fully illustrated or described, will be apparent to those having skill in the art and an understanding of the necessary functions of such devices.

FIG. 1 illustrates how the electrical power distribution system of the present invention may be employed with a conventional free standing, pre-fabricated, office furniture panel system 20. The panel system 20 is but one example of a structure with which the present invention may be employed and along which electrical power may be distributed.

The system includes panels 22 which are joined by connecting structures or hinge structures 24 so that the panels 22 may be disposed in an aligned relationship or angled relationship relative to one another so as to provide the desired orientation. Each panel 22 may be supported along its bottom end by vertically adjustable legs or feet 25.

A variety of conventional panel products are employed in the furniture industry throughout the world. The detailed design and specific structure of the panel system 20 form no part of the present invention.

The electrical power distribution system of the present invention would typically be employed along the bottom of the panel system 20 to provide electrical outlet receptacles 28, among other things, as illustrated in FIG. 1. Power may be supplied to the electrical distribution system through a flexible, power in-feed connector or entry cable assembly 30. Power may be supplied from one panel to another through a flexible, jumper connector or jumper cable assembly 34. As will be explained in detail hereinafter, the power distribution system on each panel 22 can be connected to only one power in-feed cable assembly 30 or only one power in-feed end of a jumper cable assembly 34.

In the illustrated preferred embodiment, the system includes a track or conductor assembly 40 which is adapted to be mounted to a structure, such as to the bottom of a panel 22. The track 40 is preferably furnished as a modular component in one length or a number of predetermined lengths.

The track 40 is adapted to receive movable power tap assemblies as illustrated in FIG. 3, and such power tap assemblies can include an in-feed (entry) power tap assembly 42 into which either the entry cable assembly 30 or the flexible connector jumper cable assembly 34 may be plugged. Another type of power tap assembly is an out-feed assembly or exit power tap assembly 44 into which the other end of a jumper cable assembly 34 may be plugged. The system also typically includes a receptacle power tap assembly 46 into which a conventional or special receptacle, or other electrical device, may be plugged. These power tap assemblies are described in more detail hereinafter.

In the presently preferred embodiment, the conductor assembly or track 40 includes a number of components having unique designs which facilitate manufacture and assembly as well as which provide a versatile and safe electrical power distribution system. In particular, with reference to FIG. 4A, the conductor assembly or track 40 includes a generally rigid, elongate, electrically conductive support frame 50. The frame 50 is preferably fabricated from metal, such as extruded aluminum. The frame 50 includes a top wall 52 and a pair of downwardly depending side walls 54. At the lower, distal end of each side wall 54, there is a lip 56 projecting toward the other side wall. The lips 56 cooperate with the power tap assemblies to latch the power tap assemblies in position along the conductor assembly 40 as is explained in detail hereinafter.

A partially cylindrical groove 55 is defined by the conductor assembly frame 50 on each side of the top wall 52, along the junction of the top wall 52 and side wall 54.

The frame 50 defines a first, lower, elongate, main, outer, channel 58 between the two side walls 54. The frame 50 also defines a plurality of second, upper, inner, elongate channels 62 which are each parallel to, and in communication with, the first channel 58. The frame 50 defines three pairs of intermediate flanges 64. Each pair of flanges 64 defines an intermediate opening between the first channel 58 and one of the second channels 62, and the opening defined by the flanges 64 between the first channel 58 and a second channel 62 is narrower than the second channel 62.

Although the frame wall 52 can be characterized as a "top" wall, the frame first main channel 58 can be characterized as having (1) a "bottom"(e.g., comprising the flanges 64) which is inwardly of the ends of the frame side wall lips 56 and (2) an opening defined between the lips 56 opposite the main channel bottom.

In a preferred form, the frame 50 also includes an elongate rib defining an elongate electrical contact ground surface 68. The ground surface 68 extends the entire length of the frame 50 and is preferably laterally offset, as illustrated, relative to the centerline of the width of the frame 50. Thus, two of the second channels 62 are on one side of the elongate ground surface 68, and one of the second channels 62 is on the other side of the elongate ground surface 68.

The conductor assembly 40 includes, in addition to the frame 50, an insulating system for insulating conducting elements from the frame 50. In particular, in the preferred embodiment illustrated, the insulating system includes three elongate insulating carriers 92 which are each mounted within the frame 50. Each carrier 92 is fabricated from a suitable insulating material. In the preferred form illustrated, each carrier 92 is an extrusion of a thermoplastic material having a flammability rating of 94-VO or greater as set forth in the Underwriters Laboratories standards for safety publication UL-94 (Fourth Edition dated Jun. 18, 1991).

Each carrier 92 has an enlarged, bus bar holder portion defining a plurality of spaced-apart walls 96. A recess 100 is defined between each pair of adjacent walls 96. The distal end portion of each wall 96 is enlarged to define a reduced width opening to each recess 100.

An elongate, conducting element, such as a bus bar 104, is mounted within each recess 100. In the preferred embodiment illustrated, each conducting element bus bar 104 is a tin-plated copper bar having a rectangular, transverse cross-section with a short side measuring about 0.07 inch and a long side measuring about 0.1 inch. The bus bars 104 can be mounted in the carrier recesses 100 by means of a hydraulic press and roller assembly to force the bus bars past the enlarged, distal end portions of the carrier walls 96.

When each bus bar 100 is properly installed within a receiving recess in a carrier 92, each bus bar presents an elongate, electrical contact surface facing outwardly toward the recess opening between the enlarged, distal end portions of the adjacent carrier walls 96.

Each insulating carrier 92 includes a neck portion which extends from the carrier bus bar holder portion walls 96 in the form of two spaced-apart, parallel, upwardly projecting walls 108. The neck portion walls 108 are received within, and extend through, the intermediate opening defined by the inwardly extending, intermediate flanges 64 of the frame 50.

The neck portion walls 108 terminate in a retention head defined by outwardly projecting retention flanges 110. The retention flanges 110 define a retention head which is wider than the frame intermediate opening between the intermediate flanges 64. In the preferred form of the invention illustrated, the upwardly projecting neck portion walls 108 are deflectable inwardly toward each other from an unstressed configuration. Thus, each carrier 92 can be mounted within the frame 50 by forcing the carrier 92 against the frame 50 so that the walls 108 and retention flanges 110 are temporarily deflected inwardly until the flanges 110 move past the frame flanges 64 and are free to return to the unstressed configuration wherein the retention flanges 110 engage the frame flanges 64 to retain the carrier 92 in the frame 50. Alternatively, each carrier 92 could be slid into the associated recess 62 in the frame 50 from the end of the frame.

The novel conductor assembly 40 is preferably provided with three carriers 92 as illustrated in FIG. 4A and in other figures. Each carrier 92 preferably includes three bus bars 104 to provide a total of nine bus bars. Further, the frame 50 preferably includes the elongate rib ground surface 68 between two of the carriers 92. With such a configuration, one of the nine bus bars 104 may be used as a ground along with the frame rib ground surface 68. The eight remaining bus bars 104 may be used as line conductors and neutral conductors. The ten-conductor circuit provided in the preferred form of the conductor assembly 40 can be arranged in four circuits, three circuits, two circuits, or one circuit as illustrated in the table presented in FIG. 4B.

The conductor assembly 40 may be mounted along the bottom of a panel 22 as illustrated in FIGS. 2 and 3. In particular, a typical panel 22 may include a pair of spaced-apart side walls 70 connected together along their bottom edges by a horizontal bottom wall 72. Along each vertical, side edge of the panel 22, an end wall 74 is provided across the space between the side walls 70. At the bottom of the panel 22, a pair of spaced-apart, removable skirts 76 depend downwardly to define a raceway beneath the panel bottom wall 72.

The conductor assembly 40 is disposed within the raceway, and the conductor assembly frame 50 is directly mounted to the panel bottom wall 72. In particular, the conductor assembly 40 is mounted with clips or brackets 80, preferably one adjacent each end. Each bracket 80 has a reversely bent end flange 82 for being received in one of the frame partially cylindrical grooves 55. The bracket 80 also includes an L-shaped end member 83 for engaging an end of the frame 50.

Preferably, each bracket 80 is fabricated from a metal or thermoplastic material and is sufficiently thin, at least in the region of the flanges 82, to accommodate temporary outward deflection of the flanges 82 so that the clip 80 can be snapped into engagement with the frame 50 (whereby the flanges 82 resiliently snap inwardly into the frame partially cylindrical grooves 55).

Each bracket 80 preferably includes a suitable aperture for accommodating the shank of a suitable fastener, such as a screw 88. In a preferred manner of installation, each clip 80 is initially mounted to the underside of the panel bottom wall 72 by means of the screws 88. Subsequently, the frame 50 is snapped into engagement with the clips 80.

Each panel skirt 76 is provided with a plurality of apertures or cut-outs 77 to accommodate access to outlet receptacles 28 which are mounted to the conductor assembly 40 as described in detail hereinafter.

Electrical power may be supplied to the conductor assembly 40, or taken from the conductor assembly 40, at any location along the length of the conductor assembly 40. Power is supplied to the conductor assembly 40 from the power in-feed cable assembly 30 connected to the bus bars 104 with the in-feed power tap assembly 42. Power is withdrawn from the conductor assembly 40 through the Jumper cable assembly 34 connected to the bus bars 104 with the exit power tap assembly 44. Power is supplied from the conductor assembly 40 to outlet receptacles 28 through the receptacle power tap assembly 46.

The manner in which the power in-feed power tap assembly 42, the exit power tap assembly 44, and the receptacle power tap assembly 46 engage the conductor assembly or track 40 may be substantially the same for each of the assemblies and is described in detail hereinafter. There are differences, however, with respect to the power tap assembly mating connections between the power in-feed cable assembly 30, jumper cable assembly 34, and outlet receptacle 28.

The basic power tap assembly structure will next be described with reference to a receptacle power tap assembly 46 which is illustrated in exploded perspective view in FIG. 6. In the preferred form, the receptacle power tap assembly 46 is adapted to hold two outlet receptacles 28 in a back-to-back orientation and to provide power to the receptacles 28 from the conductor assembly 40. The receptacle power tap assembly 46 is also adapted to be releasably engaged with the conductor assembly 40. The power tap assembly 46 can be moved to any desired location along the length of the conductor assembly 40. To this end, and as explained in detail hereinafter, the receptacle power tap assembly 46 is adapted to be inserted relative to the conductor assembly 40 to an "engaged" orientation in which electrical power is conducted from the conductor assembly 40 to the outlet receptacles 28. Further, the receptacle power tap assembly 46 is adapted to be electrically disengaged, yet retained on the conductor assembly 40, so as to facilitate easy sliding movement of the receptacle power tap assembly 46 lengthwise along the conductor assembly 40.

The receptacle power tap assembly 46 is adapted to hold a conventional duplex receptacle 28. There are a variety of conventional, duplex receptacle designs, or other receptacle designs, with which the receptacle power tap assembly 46 may be employed. In some cases, minor modifications of a portion or portions of the receptacle power tap assembly 46 may be required when different receptacle designs are used.

Figure 6:
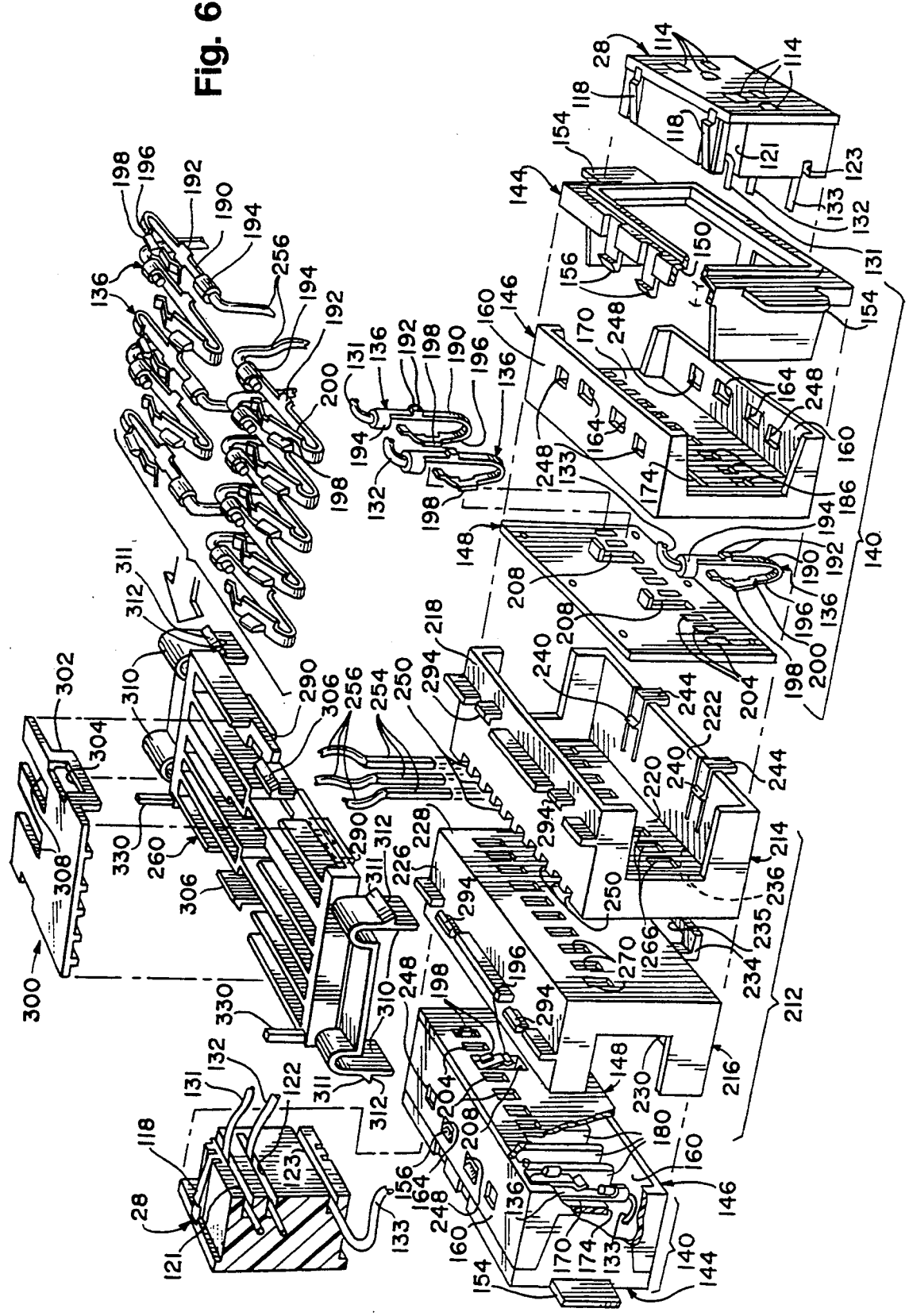
FIG. 6 is a fragmentary, exploded, perspective view of a receptacle power tap assembly which is employed in the power distribution system as shown in FIGS. 1–3 and 5.

As illustrated on the right-hand side of FIG. 6, the conventional receptacle 28 includes two sets of three, female, terminal-receiving cavities 114 for receiving a conventional, three-prong, male plug from an electrical device (e.g., typewriter, computer, etc.). The receptacle 28 also has a pair of conventional, spring-loaded, retention clips 118 on the top. A similar pair of clips is provided on the bottom (not visible).

The back of the receptacle 28 is best illustrated on the left-hand side of FIG. 6. The back of the receptacle 28 includes a first wire channel 121, a second wire channel 122, and a third wire channel 123. Each channel 121, 122, and 123 includes an embedded contact portion or terminal portion (not visible) which extends from an associated one of the female receiving cavities 114. Bare wires 131, 132, and 133 (or portions of wire from which insulation has been removed) are disposed within the channels 121, 122, and 123, respectively, for contacting the terminal portions within the channels. Each of the wires 131, 132, and 133 is routed to, and crimped to, terminals 136 which are carried in the receptacle power tap assembly 46 as described in detail hereinafter.

Each receptacle 28 is mounted within a receptacle holder 140. Each receptacle holder 140 includes three pieces, a front plate 144, a middle frame 146, and a rear spacer 148. These three pieces are preferably molded from thermoplastic material as separate, unitary pieces as illustrated in the right-hand side of FIG. 6. The three pieces are adapted to fit together as illustrated in the left-hand side of FIG. 6.

Figure 9:
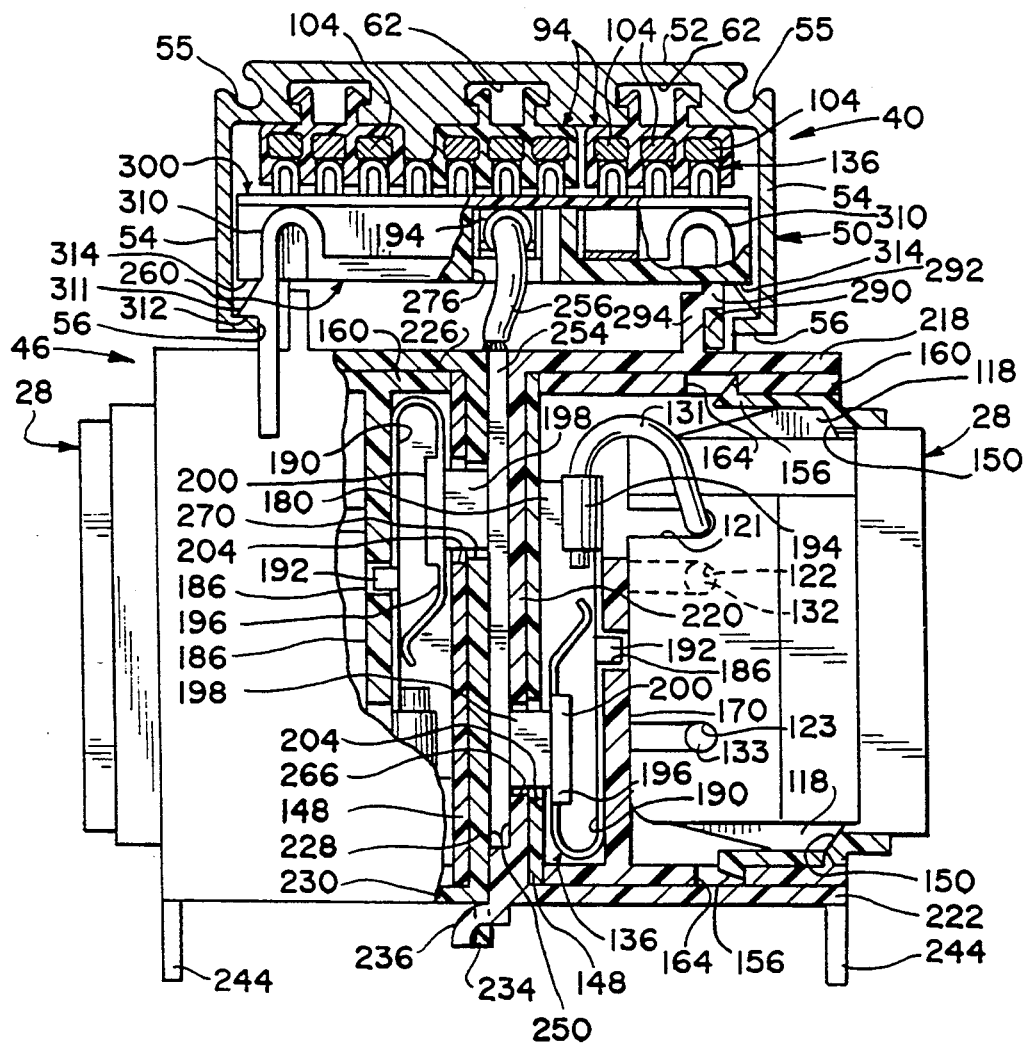
FIG. 9 is an enlarged, partial cross-sectional view of the power distribution system of the present invention taken generally along the plane 10—10 in FIG. 3 with portions of the panel system omitted for ease of illustration and showing a receptacle power tap assembly engaged with the conductor assembly in an electrically connected orientation.

The front plate 144 includes an inwardly facing shoulder 150 which defines part of a rectangular frame opening for receiving the receptacle 28 (FIGS. 6 and 9). As the receptacle 28 is inserted into the opening in the front plate 144, the spring retention clips 118 temporarily deflect inwardly. When the receptacle 28 is properly seated within the front plate 144, each clip 118 springs outwardly and its front face engages the shoulder 150 to prevent withdrawal of the receptacle 28.

The front plate 144 includes a pair of laterally extending side tabs 154 which function as finger grips and accommodate insertion or removal of the assembled receptacle holder 140 relative to the other portions of the top assembly 46 described in detail hereinafter.

The front plate 144 is adapted to be releasably coupled to the middle frame 146 by means of retention tabs 156, two of which are shown on the top of the front plate 144. Two similar retention tabs 156 are provided on the bottom of the front plate 144. The middle frame 146 includes two forwardly extending, generally parallel, horizontal walls 160 which each define two central apertures 164 for receiving one of the retention tabs 156. As the front plate 144 is inserted into the middle frame 146, the front plate tabs 156 temporarily deflect until the engaging edges of the tabs 156 are received within the apertures 164 so as to provide a releasable locking engagement of the two parts 144 and 146.

The middle frames 146 are identical. However, in each receptacle power tap assembly 46, one of the two middle frames 146 is turned upside down relative to the other middle frame 146. This is of significance with respect to the rear portion of the middle frame 146 because the rear portion includes features which are not symmetrical about a horizontal axis as will next be explained.

The middle frame 146 includes a rear wall 170. The outwardly facing surface of the wall 170 is visible in the right-hand middle frame 146 illustrated in FIG. 6, and the rearwardly facing surface of the wall 170 is visible in the left-hand middle frame 146 in FIG. 6. The rear wall 170 defines a cut-out area or rectangular aperture 174 which extends substantially along the entire length of the middle frame 146. In the right-hand middle frame 146, the rectangular aperture 174 is near the top of the rear wall 170. In the left-hand middle frame 146, wherein the middle frame 146 is turned upside down relative to the right-hand frame 146, the rectangular aperture 174 is in the lower portion of the rear wall 170.

As best illustrated for the left-hand middle frame 146 in FIG. 7, the rear wall 170 includes a plurality of rearwardly projecting, spaced-apart, parallel divider members 180. The divider members 180 define ten recesses for each receiving one of up to ten terminals 136.

When a conventional duplex receptacle 28 is used, only three terminals 136 need be mounted within the receptacle holder 140. However, because the receptacle holder 140 can be employed with other types of receptacles, as well as with an exit power tap assembly 44 or with a Jumper cable assembly 34, the middle frame 146 is preferably manufactured as a common modular component which can receive up to ten such terminals 136.

As illustrated for the right-hand middle frame 146 in FIG. 6, the rear wall 170 also defines ten spaced-apart alignment apertures 186 for each cooperating with a feature on each terminal 136 to hold the terminal 136 in position as will next be described. Specifically, each terminal 136 includes a generally straight base portion 190 having a pair of spaced-apart outwardly projecting mounting tabs 192 for being received in one of the apertures 186 in the rear wall 170 of a middle frame 146. Each terminal 136 further includes a wire holding means in the form of a pair of projecting, partially cylindrical, crimp portions 194 for being crimped around the ends of a wire (e.g., wire 131, 132, or 133).

Each terminal 136 further includes a cantilevered spring arm 196 which extends from, and is bent over, the base 190. A tab 198 projects outwardly from the spring arm 196 to define an electrical contact. In addition, the spring arm 196 is provided with outwardly and downwardly projecting side portions 200 which function to provide a heat sink and to provide increased rigidity. The distal end of the spring arm angles toward the base 190 in a shallow V-shaped configuration.

In a presently contemplated commercial form of the present invention, each terminal 136 is sized to accommodate No. 10 to No. 14 American Wire Gauge size wire with a recommended strip length of 9/32 inch. Each terminal is preferably tin-plated to between about 100 and about 300 microinches. In a presently preferred form, each terminal 136 is fabricated from terminal strip sheet material having a thickness of about 0.02 inch.

The major portion of the spring arm 196 has a normally unstressed, upwardly angled orientation. When the spring arm contact tab 198 is engaged, the spring arm 196 can be deflected toward the base 190 until it is substantially parallel to the base 190 at which point the downwardly projecting, distal end portion of the spring arm engages the base 190 and resists further downward deflection of the spring arm. Preferably, the contact tab 198 is fabricated as a bent over, substantially U-shaped portion of the terminal sheet material so as to provide a substantially rounded, generally partially cylindrical, contact surface. The edges of the tab 198 are preferably coined all around to remove burrs.

It will be appreciated that, owing to the "upside down" orientation of one of the middle frames 146 relative to the other middle frame 146 in a receptacle power tap assembly 46, the terminals 136 mounted to one of the middle frames 146 are oriented with the terminal crimp portions 194 along the upper portion of that middle frame 146 (for the right-hand middle frame 146 in FIG. 6) whereas in the other middle frame 146 (on the left-hand side of FIG. 6), the terminals 136 are oriented with the crimp portions 194 located in the lower part of the middle frame 146. In either case, the crimp portions 194 of each terminal 136 are positioned to extend adjacent the aperture 174 defined in the wall 170 of each middle frame 146. Thus, the wires (e.g., wires 131, 132, and 133) from the receptacle 28 can be routed from the receptacle 28, through the aperture 174, and into the terminals 136.

Each terminal 136 is maintained within its recess between a pair of divider members 180 in the middle frame 146 by the rear spacer plate 148 which is mounted by suitable means (e.g., mechanical staking, ultrasonic bonding, adhesive bonding, or the like) to the rear of the middle frame 146. The rear spacer plate 148 defines a row of eight, small, rectangular apertures 204 and two longer apertures 208. Each aperture 204 and 208 is aligned to accommodate the projection therethrough of one of the terminal contact tabs 198. To this end, the rear spacer plate 148 for the right-hand receptacle holder 140 shown in FIG. 6 is oriented with the apertures 204 and 208 along the lower portion of the receptacle holder 140, and the other rear spacer plate for the left-hand receptacle holder 140 shown in FIG. 6 is turned upside down to orient its apertures 204 and 208 in the upper portion of the receptacle holder 140.

The apertures 208 are longer than the apertures 204. The longer apertures 208 accommodate a greater length of the terminal spring arm 196 so that the terminal spring arm 196, and hence the contact tab 198, can project further rearwardly through the longer aperture 208. The further rearward projection of the spring arm 196 from a longer aperture 208 is more clearly shown for the left-hand receptacle holder 140 in FIG. 6. The other apertures 204, being shorter, do not permit the outwardly angled spring arm 196 to extend as far outwardly. Thus, the spring arm 196 engages the inside surface of the rear spacer plate 148 at the lower edge of the shorter aperture 204 and is held in a slightly inwardly deflected orientation with only the contact tab 198 projecting through the shorter aperture 204.

The terminals 136 which project through the two longer apertures 208 may be regarded as ground terminals and may be employed in a ground portion of a circuit so that such terminals would be the first to make contact and the last to break contact compared to the remaining terminals 136 which do not project as far rearwardly through the shorter apertures 204.

The assembled receptacle holder 140 is adapted to be received in a two-piece adaptor housing 212. The two-piece adaptor housing 212 includes a first part 214 and a second part 216. The first part 214 has a generally C-shaped configuration with a top wall 218, a rear guide wall 220, and a bottom wall 222. The second piece 216 has a top wall 226, a rear wall 228, and a bottom wall 230. The three walls in each piece 214 and 216 cooperate to define a cavity for receiving the associated receptacle holder 140.

The first piece 214 and second piece 216 are normally locked together. To this end, a pair of tabs 234 project downwardly from the lower surface of the bottom wall 230 of the second piece 216, and each tab 234 defines an aperture 235 (FIG. 6). The first piece 214 includes a pair of retention tabs 236 (FIG. 9) which project rearwardly from the lower surface of the bottom wall 222. The retention tabs 236 are received within the apertures 235 in the tabs 234 of the second piece 216 to lock the second piece 216 and first piece 214 together.

Each piece 214 and 216 is adapted to receive one of the assembled receptacle holders 140. To this end, as illustrated for the first piece 214, the bottom wall 222 of the first piece 214 defines a pair of upwardly projecting latch members 240. Each latch member 240 projects upwardly from a resilient, L-shaped tab 244 which functions as a finger-operated latch for securing the assembled receptacle holder 140 in the first piece 214 of the adaptor housing 212. In particular, the receptacle holder middle frame 146 includes a pair of spaced-apart apertures 248 in the bottom horizontal wall 160 of the middle frame 146. The apertures 248 are adapted to receive the upwardly projecting latch members 240 of the adapter housing first piece 214 as the assembled receptacle holder 140 is inserted into the first piece 214 of the adaptor housing 212. The receptacle holder 140 can be removed from the adaptor housing 212 by pressing the L-shaped latch tabs 244 downwardly to disengage the latch members 240 from the apertures 248.

Although not visible in FIG. 6, the adaptor housing second piece 216 includes a similar finger-operable latch structure on its bottom horizontal wall 230 for releasably engaging mating apertures (not visible) in the bottom wall 160 of the left-hand middle frame 146. It will be appreciated that, because the middle frames 146 are adapted to be used in one orientation on one side of the receptacle power tap assembly 46 and in an upside down orientation on the other side of the receptacle power tap assembly 46, two latch apertures 248 are provided in both the top and bottom horizontal walls 160 of each middle frame 146. Thus, a single, middle frame 146 design is interchangeable with respect to either the left-hand or right-hand side of the receptacle power tap assembly 46.

When the receptacle holder 140 is fully inserted in the first piece 214 of the adaptor housing 212, the rearwardly projecting contact tabs 198 of the terminals 136 engage vertical conducting elements in the rear wall 220 of the adaptor housing first piece 214 as will next be described. Specifically, the rear guide wall 220 of the first piece 214 of the adaptor housing 212 defines ten spaced-apart passages or channels 250 which extend substantially the entire height of the rear guide wall 220. Each channel 250 is adapted to receive a conducting member 254. Each conducting member 254 defines the distal end of a wire 256 that is routed upwardly into a terminal carrier holder or base 260 described in detail hereinafter. In a preferred form of the invention as illustrated, each conducting member 254 is an uninsulated end portion of the wire which has been formed into a generally right rectangular parallelpiped configuration for being substantially matingly received in an associated channel 250.

The rear guide wall 220 of the adaptor housing first piece 214 also defines ten apertures 266 which are each aligned with a respective one of the apertures 204 and 208 of the right-hand side receptable holder 140 and which each communicate through the rear guide wall 220 with an associated passage 250. Thus, when the receptacle holder 140 is fully inserted and locked into the first piece 114, each contact tab 198 of a terminal 136 extends through an aperture 266 and engages the surface of a conducting member 250.

Similarly, the adaptor housing second piece 216 defines a plurality of apertures 270 in the rear wall 238, and these apertures 270 are aligned with the left-hand receptacle holder apertures 204 and 208. Thus, the contact tabs 198 from the left-hand receptacle holder 140 can project through the apertures 270 to also contact the conducting members 254 when the left-hand receptacle holder 140 is inserted in the second piece 216 of the adaptor housing 212.

As previously noted, when each receptacle holder 140 is inserted into the adaptor housing 212, the one or two ground terminals 136, which project further rearwardly through the longer apertures 208 (in the receptacle housing rear spacer plate 148), will be the first terminals to make contact with the associated conducting members 254 (compared to the other terminals in the shorter apertures 204). Similarly, when the receptacle holder 140 is withdrawn from the adaptor housing 212, the one or two ground terminals 136 will remain in contact with the associated conducting members 254 until the other (up to eight other) terminals have become disengaged from the associated conducting members 254.

The adaptor housing 212 is designed to be connected to the bottom of the terminal holder or carrier base 260, and the terminal carrier base 260 carries a generally horizontally disposed array of ten terminals 136 which are each connected to one of the ten wires 256 extending upwardly from the vertical conducting members 254 in the adaptor housing 212.

The terminal carrier base 260 defines a first set of five, upwardly open, recesses or cavities 274, a second set of three, upwardly open, cavities or recesses 276, and a third set of two, upwardly open, recesses or cavities 278. One terminal 136 is disposed in each recess, but for ease of illustration, only three terminals 136 are shown in FIGS. 7 and 8.

The terminals 136 are positioned in each recess 274 with the crimped portion of the terminal disposed toward the middle of the terminal carrier base 260. In the middle of the terminal carrier base 260 there are three passages or apertures: aperture 280, aperture 282, and aperture 284. The five terminals 136 which are each disposed in one of the five recesses 274 are thus positioned so that the terminal crimped portions 194 are adjacent one of the apertures 280, 282, or 284. This allows a wire 256 to extend upwardly from the adapter housing 212 and pass through one of the apertures 280, 282, or 284 for connection to one of the terminals 136.

Similarly, each of the three terminals 136 in the recesses 276 are positioned with the terminal crimped portions 194 adjacent one of the apertures 280, 282, or 284. The terminals in the recesses 276 can thus each be connected with a wire 256 extending upwardly from the adapter housing 212 and passing through one of the apertures 280, 282, or 284.

Each of the two terminals 136 that are mounted in one of the two recesses 278 are ground terminals. These ground terminals are positioned so that the terminal crimped portions 194 lie toward one end of the terminal carrier base 260. The terminal carrier base 260 defines an aperture 288 at the end of each recess 278 for accommodating a ground wire 256 extending upwardly from the adapter housing 212 and connecting to one of the ground terminals 136 in the terminal carrier base 260.

In order to provide a means for longitudinally locating each terminal 136 in its recess and maintaining the position of the terminal on the terminal carrier base 260, the terminal carrier base 260 defines an aperture 289 in the bottom of each recess 274, 276, and 278. Each aperture 289 is adapted to receive the pair of tabs 192 which depend downwardly from each terminal base 190.

It will be noted that the five terminals 136 in the recesses 274 are not aligned with the five terminals in the recesses 276 and 278. The five terminals in the recesses 274 are longitudinally offset from the other terminals by an amount exceeding the terminal length. The five terminals in the recesses 274 are each laterally offset relative to one of the other terminals in the recesses 276 and 278 by an amount that is generally equal to the centerline spacing between said two adjacent bus bars 104 but that is less than the terminal maximum width. Thus, the widths of said power tap terminal carrier base 160 and conductor assembly 40 can be minimized with this offset array.

Figure 5:
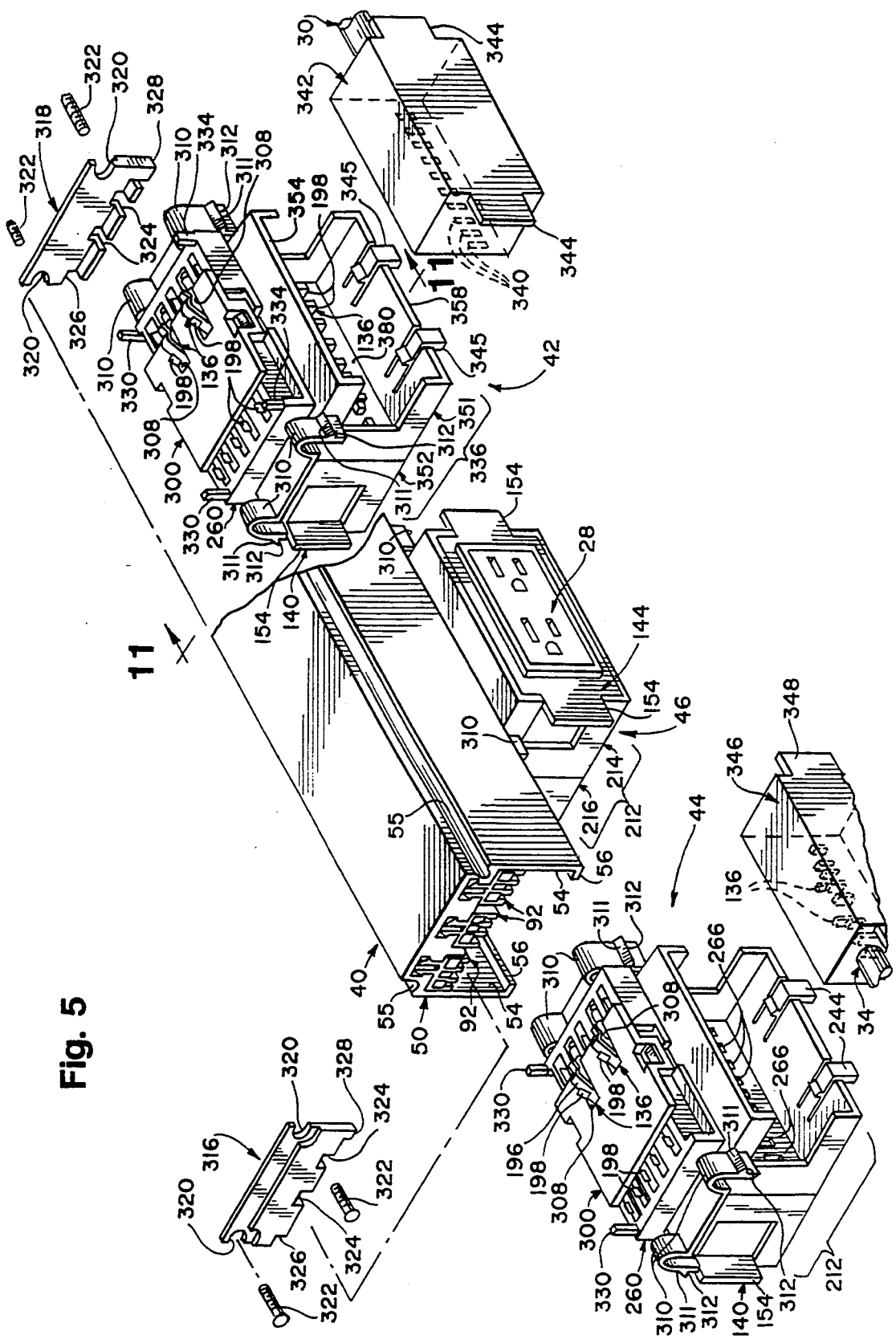
FIG. 5 is a fragmentary, exploded, perspective view of a portion of the power distribution system which is associated with one of the office furniture panels illustrated in FIG. 1.

A lid or cover 300 is mounted over a portion of the terminal carrier base 260 as illustrated in FIGS. 5 and 6. As best illustrated in FIG. 6, the cover 300 has a pair of spaced-apart tabs 302 which depend downwardly from opposite side edges of the cover 300 and which each define an aperture 304. Each aperture 304 is adapted to receive one of two latch members 306 (FIG. 6) which project upwardly on each side of the terminal carrier base 260. Each latch member 306 is deflectable inwardly when the cover 300 and carrier base 260 are brought into engagement during assembly. Each latch member 306 subsequently returns to its initial, unstressed condition wherein the hook portion of the latch member 306 is received within the aperture 304 of the associated tab 302 to provide a snap-fit engagement between the cover 300 and the carrier base 260.

When the terminal carrier base 260 and cover 300 are properly assembled, the cover 300 serves to maintain the spring arms 196 of some of the terminals 136 in a deflected position within the recesses of the terminal carrier base 260. In particular, the cover 300 does not extend completely to each end of the terminal carrier base 260, and thus the contact tabs 198 of the terminals in the recesses 274 and 276 are free to project upwardly beyond the adjacent end of the cover 300. FIG. 7 shows the outline of the installed cover in dashed lines 309. The spring arms 196 of the two ground terminals 136 in the ground terminal recesses 278 are accommodated by two spaced-apart channels 308 defined in the cover 300.

The cover 300 is long enough to engage the distal end of the terminal spring arms 196 for all of the terminals 136 except the two ground terminals. In particular, the spring arms of the five terminals in the recesses 274 and of the three terminals in the recesses 276 are engaged by the cover 300, and this engagement limits the upward projection of the spring arms of 196. However, owing to the two channels 308 in the cover 300, the spring arms 196 of the two ground terminals in the recesses 278 are completely free of the cover 300, and the ground terminal spring arms 196 are thus permitted to assume the maximum, unstressed projection. The two ground terminal contact tabs 198 thus extend further outwardly from the cover 300 than do the contact tabs of the remaining eight terminals.

The contact tabs 198 of all of the terminals in the carrier base 260 are adapted to engage, and be in electrical contact with, the bus bars 104 in the conductor assembly 40. The ground terminals, which project further outwardly beyond the cover 300, will be the first terminals to make contact with the associated bus bars 104 (compared to the other terminals which have spring arms held down a predetermined amount by the cover 300). Similarly, when the terminal carrier base 260 is withdrawn from the conductor assembly 40, the two ground terminals will remain in contact with the associated bus bars 104 until after the other terminals (up to eight other terminals) have become disengaged from the associated bus bars 104.

The terminal carrier base 260 and the adapter housing 212 can be snap-fit together. To this end, the terminal carrier base 260 includes four, downwardly projecting, U-shaped tabs 290 (FIGS. 6, 8, and 9). Two of the tabs 290 are located along one side edge of the carrier base 260, and the other two tabs 290 are located along the other side edge of the carrier base 260. Each tab 290 defines an aperture 292 (FIG. 8) for receiving a locking tab 294 which projects upwardly from the top of the adapter housing 212. In particular, the first piece 214 of the adapter housing 212 has two such tabs 294 projecting upwardly from the horizontal top wall 218, and the second piece 216 of the adapter housing 212 has two of the tabs 294 projecting upwardly from the horizontal, top wall 226. The tabs 294 are resiliently deflected outwardly as the adapter housing 212 and carrier base 260 are initially brought together during assembly. The hook end of each tab 294 then snaps into an aperture 292 of the associated tab 290 to securely latch the carrier base 260 to the adapter housing 212 (FIG. 9).

The terminal carrier base 260 employs a unique system which permits the base 260 (and power tap assembly 46 of which it is a part) to be releasably engaged with the conductor assembly 40 in order to maintain the contact tabs 198 of the terminals 136 in electrical contact with the bus bars 104 as shown in FIG. 9. In particular, at each end of the terminal base 260 there is a pair of latch tabs 310 (FIG. 6). Each latch tab 310 is adapted to engage a lip 56 of one of the conductor assembly frame walls 54 (FIG. 9). Each latch tab 310 includes an outer camming surface 311 (FIGS. 6 and 8) terminating in an outwardly extending lower latch member 312.

When the power tap assembly 46 is fully electrically engaged with the conductor assembly 40, the camming surfaces 311 are deflected inwardly by the conductor assembly lips 56, and the latch members 312 are engaged with the conductor assembly lips 56. This fully inserted, latched position of the assembly 46 maintains all of the terminal carrier base terminals 136 in engagement with the bus bars 104. In this position, the contact tab 198 of each terminal 136 in the terminal carrier base 260 engages the downwardly facing surface of an associated bus bar 104. The spring arm 196 of each terminal 136 is deflected downwardly some amount by this engagement. The spring arm deflection accommodates minor variations and manufacturing tolerances while ensuring good electrical contact. The spring arm deflection also provides a "pop out" force to assist in disengagement when the latch tabs 310 are released.

Figure 10:
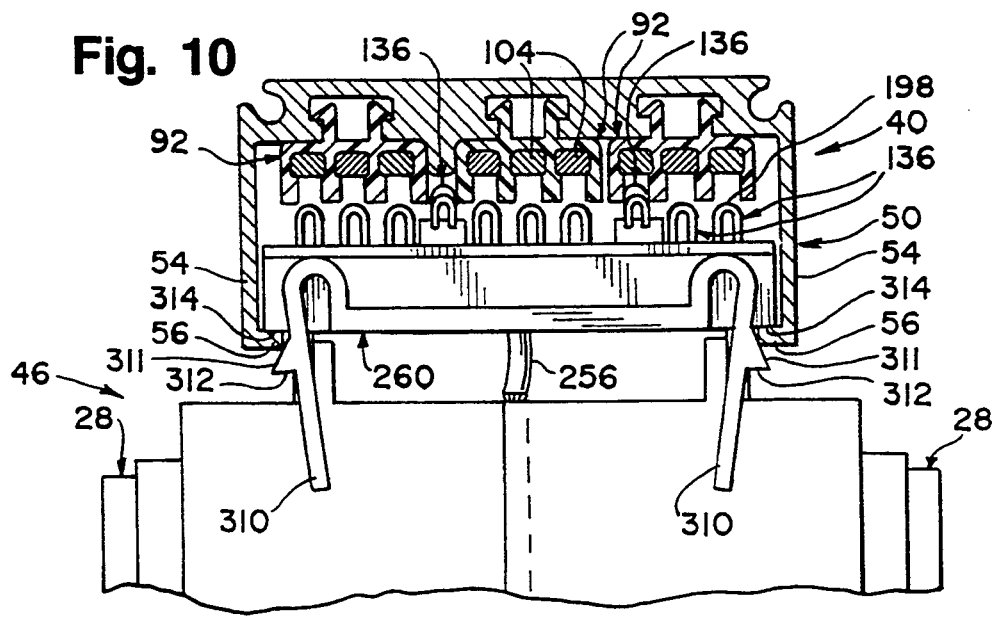
FIG. 10 is a view similar to FIG. 9 but showing the receptacle power tap assembly in an electrically disconnected orientation.

If the terminal base carrier latch tabs 310 are temporarily deflected inwardly while the terminal carrier base 260 pulled outwardly (in the direction away from the conductor assembly frame 50), then the terminals 136 will become disengaged from the bus bars 104 (FIG. 10). The carrier base has lateral margins defining a bottom surface 314 which engages the frame lips 56 and holds the terminal carrier base 260 in the frame 50 so that the terminals 136 are completely disengaged from the bus bars 104.

As the terminal carrier base 260 is moved to such an electrically disengaged position, the two ground terminals 136 (which can project further upwardly owing to the slots 308 in the cover 300) will not disengage from the associated bus bars 104 until after the other eight terminals have been disengaged. Similarly, when the terminal carrier base 260 is moved up to the fully inserted position, the two ground terminals will make contact with the associated bus bars 104 before the other eight terminals make contact. This provides for increased safety of operation.

In the preferred embodiment, the receptacle power tap assembly 46 is adapted to be slid onto the conductor assembly 40 from one end of the conductor assembly 40. The power tap assembly. 46 would typically be slid onto the conductor assembly 40 in the electrically disengaged condition wherein the latch tabs 310 are deflected inwardly and the bottom surface 314 of the base carrier 260 is on top of, and in sliding engagement with, the conductor assembly frame lips 56 (as shown in FIG. 10).

Because the conductor assembly ground surface 68 is laterally offset to one side of the longitudinal centerline of the frame 50, it is desirable to provide a means for ensuring that the receptacle power tap assembly 46 is inserted into the conductor assembly track 50 in the correct orientation so that one of the ground terminals 136 will engage the frame ground surface 68. To this end, a mechanical key, interlock, or polarization system is provided. Specifically, as shown in FIG. 5, a first end cap 316 is provided at one end of the conductor assembly frame 50, and a second end cap 318 is provided at the other end of the conductor assembly frame 50.

The vertical elevation view of one side of one end cap is essentially a mirror image of the vertical elevation view of the analogous side of the other end cap. Each end cap 316, 318 includes a pair of spaced-apart recesses 320 for accommodating the shanks of screws 322 which each engage the frame 50 in the partially cylindrical recesses 55 at the two upper corners of the frame 50 and which thereby hold each end cap on the end of the frame 50.

Each end cap 316 and 318 also defines a pair of spaced-apart, downwardly open channels 324. Each channel 324 is adapted to accommodate passage of one of the two ground terminals 136 which project upwardly further than the other eight terminals.

A corner of each end cap 316 and 318 has a clearance passage, cutout, or notch 326. At the other end of each end cap there is a downwardly projecting abutment or tab 328. Each terminal carrier base 260 has a pair of upwardly projecting abutments or posts 330 on one side (FIGS. 5 and 6). The posts 330 are in alignment along one side edge of the terminal carrier base 260. The posts 330 can pass through the notches 326 in the lower corner of each end cap 316 and 318 when the terminal carrier base 260 is properly oriented as illustrated. It will be apparent that if the terminal carrier base 260 is rotated 180° so that the posts 330 are aligned along the opposite side of the conductor assembly frame 50, then the posts 330 would be in alignment with the tabs 328 projecting downwardly from each end cap 316 and 318. This would prevent insertion of the terminal carrier base 260 into the frame 50 in that orientation. Thus, each terminal base 260 can only be properly inserted into the frame 50 in one orientation so that the ground terminals are properly aligned with ground conductors within the frame 50. Hence, the above-described post and tab structure may be characterized as functioning to accommodate longitudinal positioning of the terminal carrier base 260 into and out of the track in only one of two 180 degree end-for-end rotation orientations.

The terminal carrier base 260 for the in-feed power tap assembly 42 is similar to the terminal carrier base 260 described above with reference to the receptacle power tap assembly 46. However, as shown in FIG. 5, the in-feed power tap assembly terminal carrier base 260 preferably includes an additional pair of abutments, engaging structures, or posts 334 along a side edge opposite the posts 330. As explained hereinafter, these additional posts 334 prevent removal of the in-feed power tap assembly 42 from the conductor assembly 40 after the end caps 316 and 318 are installed.

When the in-feed power tap assembly 42 is properly mounted in the track frame 50, the posts 334 are aligned with the downwardly depending tabs 328 of the end caps 316 and 318. If the in-feed power tap assembly 42 is slid to one end or the other of the track 50, then the end cap tab 328 will engage one of the posts 334 and prevent the in-feed power tap assembly 42 from being slid out of the frame 50.

The in-feed power tap assembly 42 is preferably provided to the user as already installed on the track or frame 50 so that it cannot be removed because of the interference between the posts 334 and end cap tabs 328. The in-feed power tap assembly 42 can, however, be electrically engaged and disengaged from the conductor assembly 40 via the latch tabs 310 on the terminal carrier base 260. The in-feed power tap assembly 42 can also be moved longitudinally along the conductor assembly frame 50 to a desired location.

Typically, the in-feed power tap assembly 42 would be positioned near one end of the frame 50 so as to leave the remaining portion of the frame 50 free for additional components, such as one or more receptacle power tap assemblies 46. Although the in-feed power tap assembly 42 is typically located at one end of the frame 50, in some situations it may be desirable to move the in-feed power tap assembly 42 inwardly from one end so as to accommodate, or take up, slack or excess length in the flexible, in-feed cable assembly 30.

The in-feed power tap assembly 42 includes an adapter housing 336 somewhat similar to the adapter housing 212 employed in the receptacle power tap assembly 46 described above. The in-feed power tap assembly adapter housing 336 includes ten outwardly projecting terminals 136 (FIG. 5) which are identical to the terminals 136 used in the other components. The terminals 136 have contact tabs 198 which are adapted to be received in suitable female conducting cavities 340 in a female connector body 342 on the distal end of the in-feed cable assembly 30. The female connector body 342 is preferably provided with tabs 344 to assist in inserting or removing the female connector body 342. Latches 345 (FIG. 5) are provided on the in-feed power tap assembly adapter housing 336 to engage mating recesses (not visible) in the female connector body 342.

Figure 11:
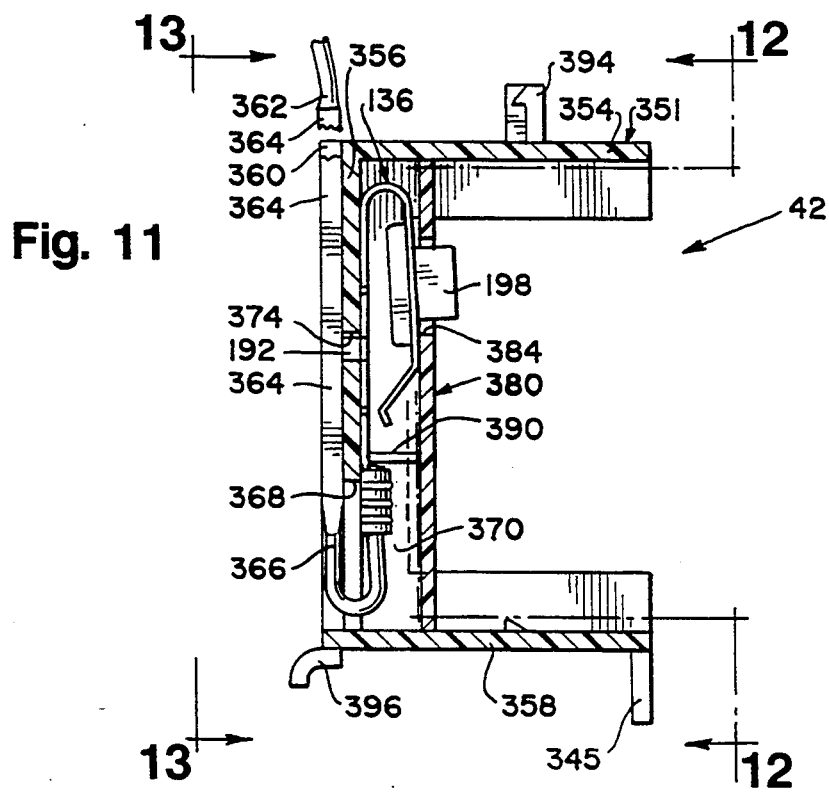
FIG. 11 is an enlarged, fragmentary, partial cross-sectional view taken generally along the plane 11—11 in FIG. 5.

As illustrated in FIG. 5, the in-feed power tap assembly adapter housing 336 includes a first piece 351 and a second piece 352. The first piece 351 is illustrated in greater detail in FIGS. 11-13. The first piece 351 is somewhat similar to the first part 214 of the adapter housing 212 described above. As can be seen in FIG. 11, the first part 351 has a generally C-shape configuration with a top wall 354, a rear guide wall 356, and a bottom wall 358. The three walls cooperate to define a cavity for receiving the female connector body 342.

Figure 13:
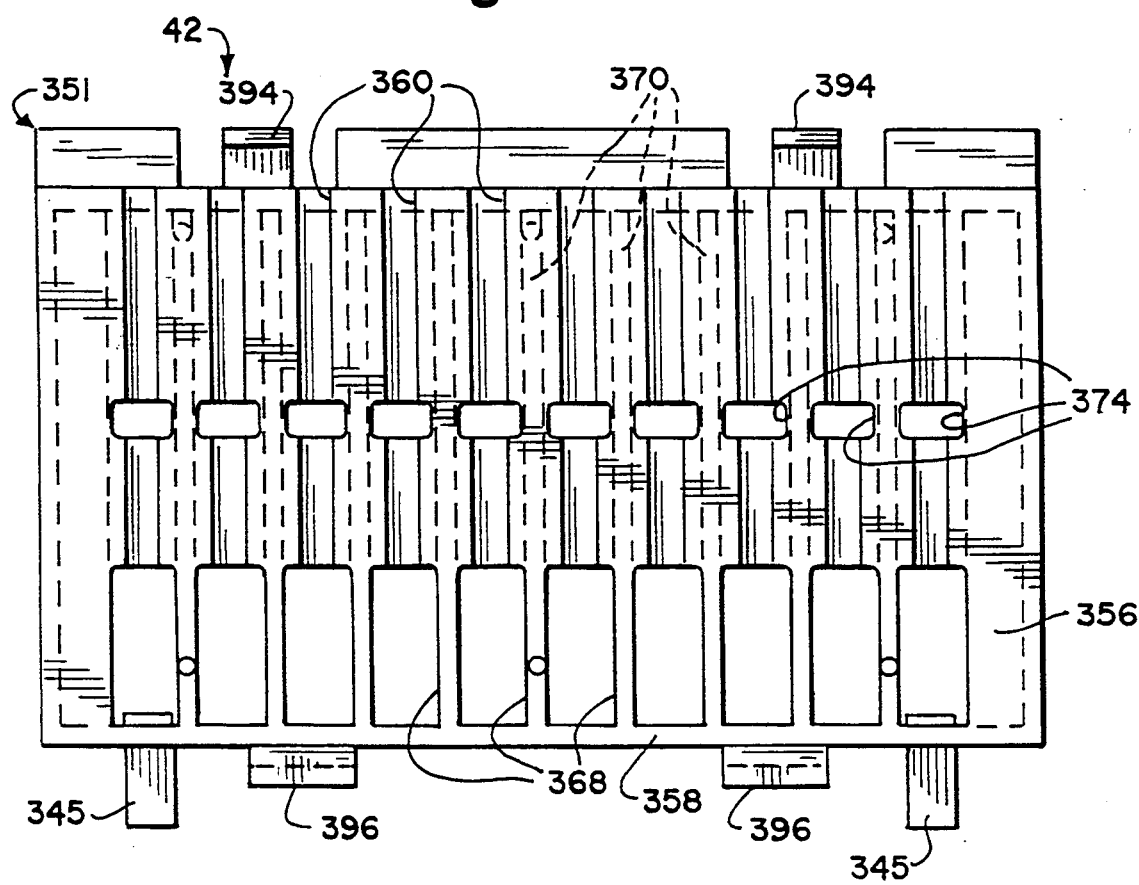
FIG. 13 is an enlarged, rear elevational view taken generally along the plane 13—13 in FIG. 11 but with the terminals and connecting wires omitted for ease of illustration and for purposes of illustrating interior detail.

The rear wall 356 defines ten, spaced-apart, vertical passages or channels 360 (FIG. 13). As illustrated in FIG. 11, each channel 360 is adapted to receive a conducting member 364 which, in the preferred embodiment, has a generally square or rectangular transverse cross section. Each conducting member 364 is formed in a bare wire which has an upwardly extending wire portion 362 which is routed upwardly into the terminal carrier base 260 for being connected to one of the ten terminals 136 mounted in the terminal carrier base 260. The lower end of each conducting member 364 has a lower wire portion 366 which is routed through an aperture 368 (FIGS. 11 and 13) in the rear guide wall 56 to the interior of the first piece 351 where it is connected to one of the terminals 136. As can be seen in FIG. 13, there are ten, spaced-apart apertures 368 defined in the rear wall 356. Each aperture 368 is at the lower end of one of the channels 360.

Figure 12:
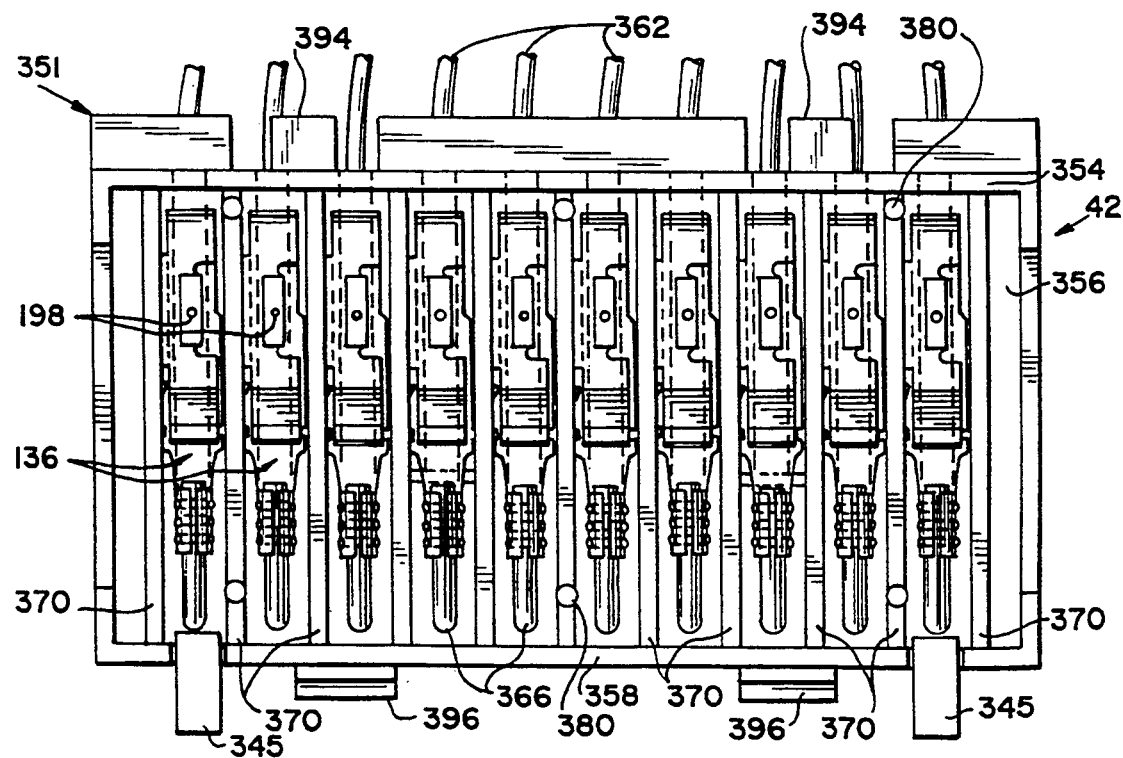
FIG. 12 is a front, elevational view taken generally along the planes 12—12 in FIG. 11.

As illustrated in FIG. 12, the ten terminals 136 are positioned in a spaced-apart array across the surface of the rear wall 356, and each terminal 136 is insulated on each side between a pair of spaced-apart insulating walls 370 which project outwardly from the rear wall 356.

As previously discussed, each terminal 136 includes a mounting tab 192 (FIG. 11) which projects outwardly from the terminal base. In order to accommodate these mounting tabs 192, the rear wall 356 defines ten, spaced-apart receiving apertures 374 (FIG. 13). Each mounting tab 192 is vertically positioned within a receiving aperture 374 as shown in FIG. 11.

The terminals 136 are maintained against the rear wall 356 by a cover plate 380. The cover plate 380 is similar to the plate 148 described above for the receptacle holder 140 illustrated in FIG. 6. The cover plate 380 is positioned against the forwardly facing ends of the insulator walls 370 as illustrated in FIG. 11, and is staked thereto by six staking members (not visible) which are received in six staking apertures 380 (FIG. 12).

The cover plate 380 defines ten, spaced-apart apertures 384 (FIG. 11) for accommodating the outwardly projecting contact tabs 198 of the terminals 136. Preferably, two of the terminals 136 may be characterized as ground terminals, and these two terminals, when not engaged by the female connector body 42, extend outwardly further than the other eight terminals. (This further extension of two of the terminals is not visible in the figures). To this end, two of the apertures 384 can be made longer than the remaining eight apertures so as to permit the two ground terminal spring arms and tabs 198 to project further outwardly through the longer apertures. Because the two ground terminal spring arms extend through the longer apertures 384 and are not engaged by the cover plate 380, a special structure must be provided for retaining the two ground terminals in place against the rear wall 356. To this end, the cover plate 380 also includes two, rearwardly extending retention members 390 (FIG. 11) each being associated with one ground terminal for engaging the base of the ground terminal 136 and holding it in position against the rear wall 356.

The top wall 354 of the first piece 351 defines latching tabs 394 for engaging mating receiving members of the terminal base 260 (such as the receiving members 292 previously described with reference to the terminal base 260 illustrated in FIGS. 6 and 8).

The bottom wall 358 of the first piece 351 includes a pair of spaced-apart, rearwardly projecting tabs 396 (FIGS. 11-13) for each being received in a mating latch member (not visible) of the second piece 352. (Such a mating latch member on the second piece 352, although not visible in the figures, is substantially identical to the mating latch member 234 of the adapter housing second piece 216 described above with reference to FIGS. 6 and 9.) This latch system for the housing 336 enables the first piece 351 and second piece 352 to be latched together in a back-to-back configuration as illustrated in FIG. 5.

The adapter housing 336 in the in-feed power tap assembly 42 is designed to permit power to be supplied to the system at only one location (i.e., at the terminals 136 in the adapter housing first piece 351). Accordingly, the other side of the adapter housing 336 (i.e., the second piece 352 facing away from the terminals 136) does not include any terminals into which power can be supplied via a power in-feed cable assembly 30. Instead, the second piece 352 of the adapter housing 336 has substantially the same structure as described above for the receptacle power tap assembly adapter housing second piece 216. Thus, the power in-feed adapter housing 336 can receive a receptacle (as carried by a receptacle holder 140) in the second piece 352 facing away from the ten terminals 136. Alternatively, a connector jumper cable assembly 34 could be connected to the second piece 352 of the in-feed power tap assembly 42 on the side opposite the terminals 136 for supplying power from the assembly 42 to another panel adjacent that location. The structure of such a jumper cable assembly 34 is described hereinafter.

The out-feed or exit power tap assembly 44 is typically mounted at the opposite end of the conductor assembly 40 relative to the in-feed power tap assembly 42. The exit power tap assembly 44 is similar to the receptacle power tap assembly 46 described above.

As shown in FIG. 5, the exit power tap assembly 44, like the receptacle power tap assembly 46, includes an adapter housing 212 mounted to the bottom of the terminal carrier base 260. The adapter housing 212 of the exit power tap assembly 44 defines a plurality of apertures 266 which expose vertical conducting elements (identical to the elements 254 for the receptacle power tap assembly 46), and these can be engaged by suitable terminals of a connecting component.

As shown in FIG. 5, the exit power tap assembly 44 is adapted to receive a male connector body 346 which defines one end of the jumper cable assembly 34. The male connector body 346 includes ten terminals 136 which are each identical to the previously described terminals 136 in the carrier base 260 or receptacle housing 140. The terminals 136 in the male connector body are received in, and are adapted to be electrically engaged with, the exit power tap assembly 44. Specifically, the above-described vertical conducting elements in the exit power tap assembly adaptor housing 212 are engaged by the jumper cable assembly male connector body terminals 136 projecting through the apertures 266 when the jumper cable male connector body 346 is inserted into the exit power tap assembly 44. Latches 244 are provided on the exit power tap assembly adapter housing 212 to engage mating recesses (not visible) in the jumper cable male connector body 346. Finger tabs 348 are provided on the male connector body 346 for facilitating insertion and removal of the male connector body 346.

The other end of the jumper cable assembly 34, as shown in FIG. 3, includes a female connector body 342 which is like the female connector body 342 on the in-feed cable assembly 30. The female connector body 342 of the jumper cable assembly 34 can be connected to an in-feed power tap assembly 42 of an adjacent panel 22.

Because the adapter housing 212 of the exit power tap assembly 44 defines two cavities facing in opposite directions, it is possible to connect two jumper cable assemblies 34 to a single exit power tap assembly 44 so as to be able to supply power to two adjacent panels from one assembly 44. Alternatively, and as illustrated in FIG. 5, a receptacle holder 140 may be inserted in one side of the exit power tap assembly 44 while a jumper cable assembly 34 can be connected to the other side of the exit power tap assembly 44.

The in-feed power tap assembly 30 and the jumper cable assembly 34 have each been illustrated as a single cable structure. However, where desired, two or more cables may be employed in parallel, and the total number of circuits could be divided among the plurality of parallel cables.

The above-described modular components for the power distribution system are extremely versatile and are adaptable to a variety of applications and configurations. The components incorporate unique designs which accommodate efficient manufacturing techniques.

The components can be assembled in a system that provides a directional feature for preventing the possibility of installing two power feeds. The system incorporates a variety of other safety features, including mechanical key systems for preventing incorrect installation of components and including the use of special ground terminals which are first to establish an electrical connection and are last to break an electrical connection. Advantageously, the components can be safely installed or removed while the system is energized.

In the preferred form, the components can be inserted and electrically engaged with a relatively low force (e.g., less than 25 pounds). This minimizes the possibility of a user attempting to incorrectly install components by using extreme force.

The unique component design provides movable power tap assemblies that do not rely on friction clamping of electrical conductors for maintaining electrical contact. The electrical contact is established by a direct surface-to-surface butt contact between separate contact members. This has the advantage of minimizing the amount of force necessary for proper electrical engagement and therefor reduces the required insertion and removal forces.

The novel use of spring terminals also provides a biasing force that helps disengage a component that is being electrically disconnected. The spring terminals tend to cause the component to "pop out" to the disengaged position when the latch is released.

The power distribution system is relatively compact and can thus be installed in office furniture panels or other structures in a way that leaves space available for other systems, such as communications wiring. Despite the compact nature of the system, it can accommodate a plurality of circuits. In the preferred form, a ten conductor system with two grounds can be provided in a very compact arrangement.

The system can be used with conventional components, such as conventional receptacles. The system accommodates location of input power feeds and exit power connections, as well as receptacles, at any desired location along the length of the system.

Further, although the invention has been described or depicted in one specific system for use in office furniture panels, it will be understood that the invention can be used on or in other structures. It will be apparent that other variations and modifications as come within the scope of the appended claims can be considered part of the present invention without departing from the true spirit and scope of the novel concepts or principles of this invention.

What is claimed is:

1. An elongate electrical conducting system with which a multi-terminal power tap assembly can be engaged to conduct electricity into or out of said system, said system comprising:

an elongate, electrically conductive support frame suitable for mounting to a structure along which electrical power distribution is desired, said frame defining an elongate receiving main channel therein with a bottom and an opening opposite said bottom, said frame having an elongate electrical contact ground surface unitary with said frame and located within said main channel adjacent said main channel bottom opposite said opening to face out of said main channel opening for being engaged by a terminal of said power tap assembly;

at least one insulating carrier disposed in said main channel permitting access to said ground surface from outside of said main channel, said carrier having a plurality of spaced-apart walls defining a recess between each pair of adjacent walls; and a plurality of elongate conducting elements each disposed within one of said insulting carrier recesses, each said element defining a planar contact surface facing outwardly of said main channel for being engaged by a terminal of said power tap assembly, and all said contact surface lying generally in a common plane.

2. The system in accordance with claim 1 in which said frame defines a second channel parallel to, and in communication with said main channel, said frame having a pair of flanges defining an intermediate opening between said main and second channels which is narrower than said second channel, said insulating carrier having (1) a bus bar holder portion in said frame main channel, (2) a neck portion in said intermediate opening, and (3) a retention head wider than said intermediate opening disposed in said frame second channel to mount said carrier in said frame.

3. An elongate electrical conducting system with which a multi-terminal power tap assembly can be engaged to conduct electricity into or out of said system, said system comprising:

an elongate, electrically conductive support frame suitable for being mounted to a structure along which electrical power distribution is desired, said frame defining an elongate receiving main channel therein and having an elongate electrical contact ground surface located within said main channel to face outwardly of said channel for being engaged by a terminal of said power tap assembly;

insulating carriers disposed in said main channel permitting access to said ground surface from outside said main channel, each said carrier having a plurality of spaced-apart walls defining a recess between each pair of adjacent walls;

three of said insulating carriers are disposed in said frame main channel with one of said three carriers being located on one side of said elongate electrical contact ground surface and with another of said three carriers being located on the other side of said elongate electrical contact ground surface; and a plurality of elongate conducting elements each disposed within one of said insulating carrier recesses and each defining a contact surface facing outwardly of said main channel for being engaged by a terminal of said power tap assembly.

4. A system suitable for distributing electrical power at selected locations along a structure, said system comprising:

a conductor assembly having elongate, electrically conducting elements suitable for being disposed along said structure, said conductor assembly further including a pair of spaced-apart, elongate walls that are electrically insulated from said conducting elements and that are disposed to project outwardly along said conducting elements to define a channel opening to said conducting elements; and a power tap assembly for being disposed at least partly within said channel at selected locations along said conductor assembly and having a plurality of terminals for each engaging one of said conductor elements, said power tap assembly and said conductor assembly cooperatively defining an insertion depth-positioning structure for releasably retaining said power tap assembly in (1) a fully inserted position with said terminals engaged with said conducting elements and (2) a partially inserted position with said terminals disengaged from said conducting elements to accommodate relocation of said power tap assembly along the length of said conductor assembly.

5. The system in accordance with claim 4 in which each said insertion depth-positioning structure includes lips on said conductor assembly walls, a bottom surface of said power tap assembly, and a latching tab having a generally inverted, U-shaped member having one longer leg extending downwardly below said bottom surface of the power tap assembly.

6. The system in accordance with claim 5 in which said power tap assembly includes four of said latching tabs arranged in two pairs, one pair being located at one end of said power tap assembly and the other pair being located at the other end of said power tap assembly.

7. A system suitable for distributing electrical power at selected locations along a structure, said system comprising:

a conductor assembly having elongate, electrically conducting elements suitable for being disposed along said structure, said conductor assembly further including a pair of spaced-apart, elongate walls that are electrically insulated from said conducting elements and that are disposed to project outwardly along said conducting elements to define a channel opening to said conducting elements, each said wall including a lip projecting toward the other wall; and a power tap assembly for being disposed at least partly within said channel at selected locations along said conductor assembly and having a plurality of terminals for each engaging one of said conductor elements, said power tap assembly including at least one pair of spaced-apart latching tabs, each tab being deflectable inwardly toward the other from an unstressed configuration, each said tab including an outwardly facing camming surface terminating in a latch surface whereby said camming surfaces are engaged by said wall lips and deflected inwardly as said power tap assembly is inserted into said channel until said camming surfaces have moved past said lips and said tabs are free to return to the unstressed configuration where said latch surfaces releasably engage said lip to retain said power tap assembly on said walls in a fully inserted position with said terminals engaged with said conducting elements. said latch surface being a first latch surface and each said power tap assembly including a bottom surface spaced above said first latch surface, and lateral margins of said bottom surface defining a second latch surface for engaging one of said lips to hold said power tap assembly on said walls in a partially inserted position with said terminals disengaged from said conducting elements.

8. The system in accordance with claim 7 in which each said terminal has an upwardly angled, deflectable, contact arm having a length that is insufficient to contact an associated conducting element when said power tap assembly is in said partially inserted position with said terminals disengaged from said conducting elements.

9. A system suitable for distributing electrical power at selected locations along a structure, said system comprising:

a conductor assembly having elongate, electrically conducting elements suitable for being disposed along said structure, said conductor assembly further including a pair of spaced-apart, elongate walls that are electrically insulated from said conducting elements and that are disposed to project outwardly along said conducting elements to define a channel opening to said conducting elements, each said wall including a lip projecting toward the other wall; and a power tap assembly for being disposed at least partly within said channel at selected locations along said conductor assembly and having a plurality of terminals for each engaging one of said conducting elements, said power tap assembly including at least one pair of spaced-apart latching tabs, each tab being deflectable inwardly toward the other from an unstressed configuration, each tab including an outwardly facing camming surface terminating in a latch surface whereby said camming surfaces are engaged by said wall lips and deflected inwardly as said power tap assembly is inserted into said channel until said camming surfaces have moved past lips and said tabs are free to return to the unstressed configuration where said latch surfaces releasably engage said lips to retain said power tap assembly on said wall in a fully inserted position with said terminals engaged with said conducting elements, some of said terminals each having (1) a base and a cantilevered contact arm extending from said base at an angle relative to said conducting elements when the arm is in an unstressed, release position and (2) a distal end extending downwardly toward said base, and said arm being deflectable from said unstressed position whereby, when said power tap assembly is in said fully inserted position, said terminals are deflected by, and are in contact with, said conducting elements and said arm distal end engages said base.

10. An electrical power distribution system comprising:
- an elongate support frame suitable for being mounted to a structure along which electrical power distribution is desired, said support frame defining a first elongate channel and a second elongate channel which is narrower than said first channel, which is parallel to said first channel, and which is in communication with said first channel, said frame having a pair of flanges defining an intermediate opening between said first and second channels which is narrower than said second channel;
- at least two insulating carriers each received in said frame, said carrier having (1) a bus bar holder portion in said frame first channel outwardly of said intermediate opening, (2) a neck portion in said intermediate opening, and (3) a retention head which is wider than said intermediate opening, which is narrower than said bus bar holder portion, and which is disposed inwardly of said intermediate opening in said frame second channel to mount said carrier in said frame, said carrier bus bar holder portion having a plurality of spaced-apart walls defining a recess between each pair of adjacent walls and a reduced width opening thereto;
- a plurality of bus bars each disposed within one of said insulating carrier recesses, each said bar defining a planar elongate electrical contact surface facing outwardly toward said reduced width opening and out of the opening of said first elongate channel for engagement by an electrical terminal, and all of said contact surfaces lying generally in a common plane.

11. An electrical power distribution system comprising:
- an elongate support frame suitable for being mounted to a structure along which electrical power distribution is desired, said support frame defining a first elongate channel and three second elongate channels parallel to, and in communication with, said first channel, said frame having a pair of flanges associated with each said second channel defining an intermediate opening between said first channel and each said second channel which is narrower than said second channel;
- three insulating carriers received in said frame, each said carrier having (1) a bus holder portion in said frame first channel, (2) a neck portion in one of said intermediate openings, and (3) a retention head wider than said one intermediate opening disposed in one of said frame second channels to mount said carrier in said frame, each said carrier bus bar holder portion having a plurality of spaced-apart walls defining a recess between each pair of adjacent walls and a reduced width opening thereto; and
- a plurality of bus bars, one of which bars is disposed within each of said insulating carrier recesses to present an elongate electrical contact surface facing outwardly toward said reduced width opening for engagement by an electrical terminal.

12. An electrical power distribution system comprising:
- an elongated support frame suitable for being mounted to a structure along which electrical power distribution is desired, said support frame defining at least one elongate channel therein;
- a plurality of elongated conducting elements each disposed within said frame channel to present an outwardly facing elongate electrical contact surface;
- a power tap assembly for being selectively positioned longitudinally along said frame channel to conduct electricity into or out of said conducting elements;
- abutment means projecting from said power tap assembly and being laterally offset relative to the longitudinal centerline of said channel; and
- said frame having an end portion at each end of said frame, each said end portion defining a clearance passage means that is laterally offset relative to the longitudinal centerline of said channel for being in registration with said abutment means only when said power tap assembly and frame are aligned for proper insertion of said power tap assembly into said frame channel whereby said power tap assembly can be longitudinally positioned into and out of said track in only one of two 180 degree end-for-end rotation orientations, said frame and power tap assembly preventing removal of said power tap assembly in a direction perpendicular to the length of said frame.

13. An electrical power distribution system comprising:
- an elongated support frame suitable for being mounted to a structure along which electrical power distribution is desired, and support frame defining at least one elongate channel therein having an opening therein;
- a plurality of elongate conducting elements each disposed within said frame channel to present an outwardly facing elongate electrical contact surface facing out of said opening;
- a power tap assembly for being selectively positioned longitudinally along said frame channel and retained therein to conduct electricity into or out of said conducting elements;
- an engagement structure at least adjacent each end of said power tap assembly projecting upwardly therefrom and extending only partially across the width of said power tap assembly;
- an abutment means on each end of said frame for being engaged by said engagement structure to prevent longitudinal displacement of said power tap assembly beyond either end of said frame channel; and
- said frame and power tap assembly cooperatively defining a retention structure for preventing removal of said power tap assembly by pulling it generally perpendicular to the length of said frame.

14. An elongate electrical conducting system with which a multi-thermal power tap assembly can be engaged to conduct electricity into or out of said system, said system comprising:
- an elongate, electrically conductive support frame suitable for being mounted to a structure along which electrical power distribution is desired, said frame defining an elongate receiving main channel therein with a bottom and an opening opposite said bottom, said frame having an elongate electrical contact ground surface located within said main channel to face out of said main channel opening for being engaged by a terminal of said power tap assembly;

insulating carriers disposed in said main channel permitting access to said ground surface from outside said main channel, each said carrier having a plurality of spaced-apart walls defining a recess between each pair of adjacent walls, at least two of said insulating carriers being disposed in said frame main channel with one of said carriers being located on one side of said elongate electrical contact ground surface and with another of said carriers being located on the other side of said elongate electrical contact ground surface; and a plurality of elongate conducting elements each disposed within one of said insulating carrier recesses and each defining a contact surface facing out of said main channel opening for being engaged by a terminal of said power tap assembly.

15. A system suitable for distributing electrical power at selected locations along a structure, said system comprising:

a conductor assembly having elongate, electrically conducting elements suitable for being disposed along said structure, said conductor assembly further including a pair of spaced-apart, elongate walls that are electrically insulated from said conducting elements and that are disposed to project outwardly along said conducting elements to define a channel opening to said conducting elements, each said wall including ga lip projecting toward the other wall; and a power tap assembly for being disposed at least partly within said channel at selected locations along said conductor assembly and having a plurality of terminals for each engaging one of said conducting elements, said power tap assembly inculding at least one pair of spaced-apart latching tabs, each tab being deflectable inwardly toward the other from an unstressed configuration, each said tab including a outwardly facing camming surface and a tab latch surface whereby said camming surfaces are engaged by said wall lips and deflected inwardly as said power tap assembly is inserted into said channel until said camming surfaces have moved past said lips and said tabs are free to return to the unstressed configuration where said latch surfaces releasably engage said lips to retain said power tap assembly on said walls in a fully inserted position with said terminals engaged with said conducting elements, each said power tap assembly including a bottom surface spaced above said tab latch surface, said lateral margins of said bottom surface functioning to engage one of said lips to hold said power tap assembly on said walls in a partially inserted position with said terminals disengaged from said conducting elements.

16. An electrical power distribution system comprising:

an elongate support frame suitable for being mounted to a structure along which electrical power distribution is desired, said support frame defining a main elongate channel and at least two secondary elongate channels parallel to, and in communication with, said channel, said frame having pairs of flanges with each pair defining an intermediate opening between said main channel and one of said secondary channels which is narrower than said secondary channel;

at least two insulating carriers received in said frame, each said carrier having (1) a bus bar holder portion in said frame main channel, (2) a neck portion in said intermediate opening, and (3) a retention head wider than said intermediate opening disposed in one of said frame secondary channels to mount said carrier in said frame, said carrier bus bar holder portion having a plurality of spaced-apart walls defining a recess between each pair of adjacent walls and a reduced width opening thereto;

a plurality of bus bars, each disposed within one of said insulating carrier recesses to present an elongate electrical contact surface facing outwardly toward said reduced width opening and also outwardly toward the opening to said first channel for engagement by an electrical terminal.

* * * * *